Oct. 5, 1954  H. J. WILLMOTT  2,690,560
FASTENING INSERTING MACHINE
Filed Sept. 29, 1951  18 Sheets-Sheet 4
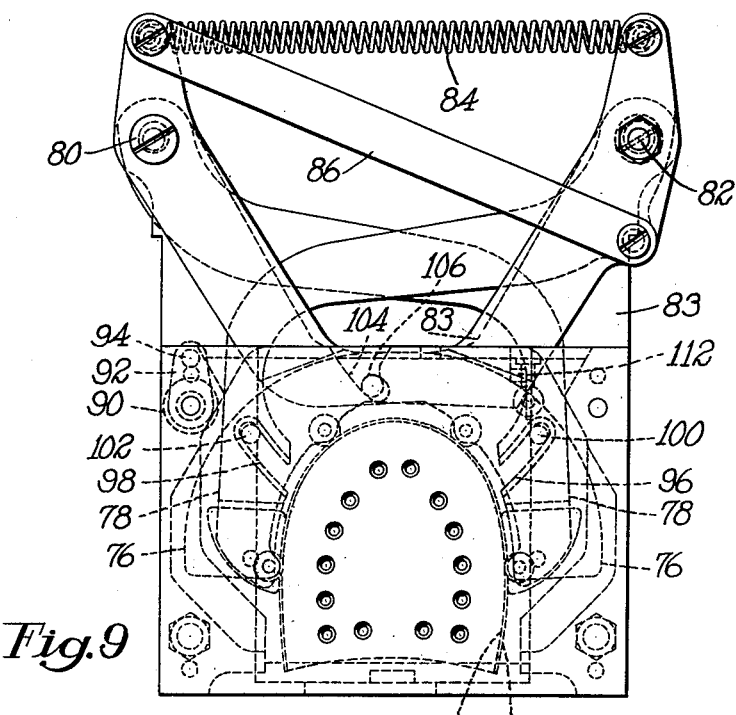
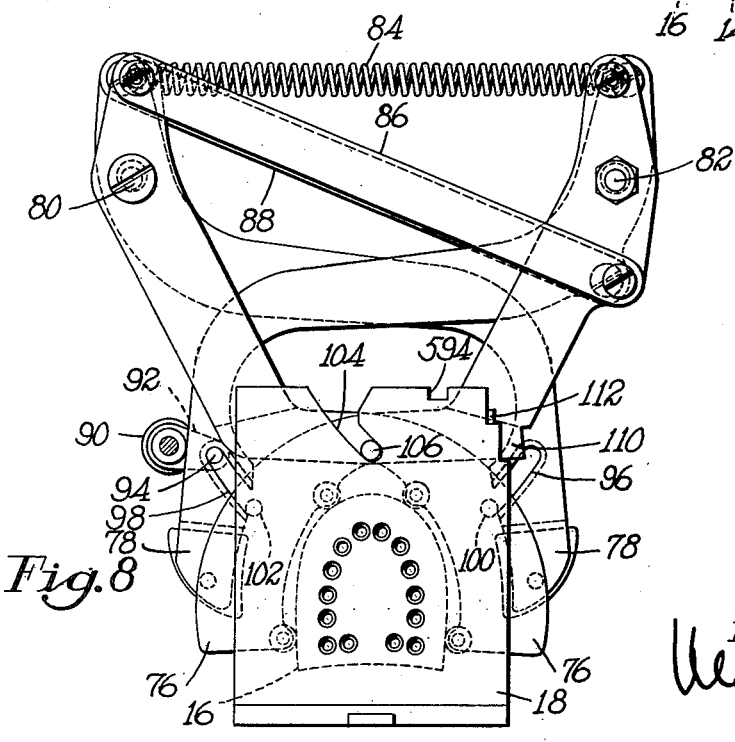
Inventor
Herbert J. Willmott
By his Attorney

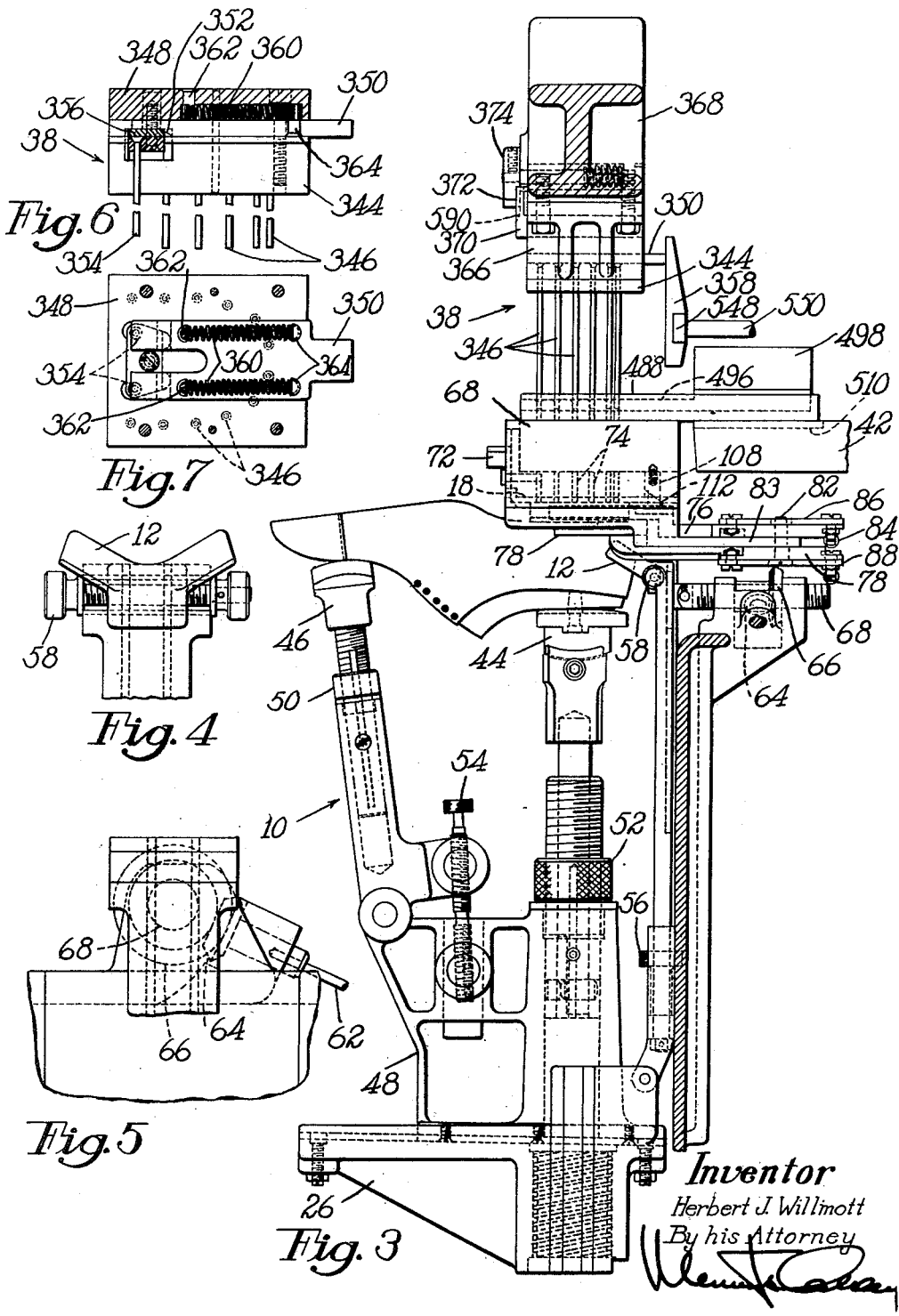

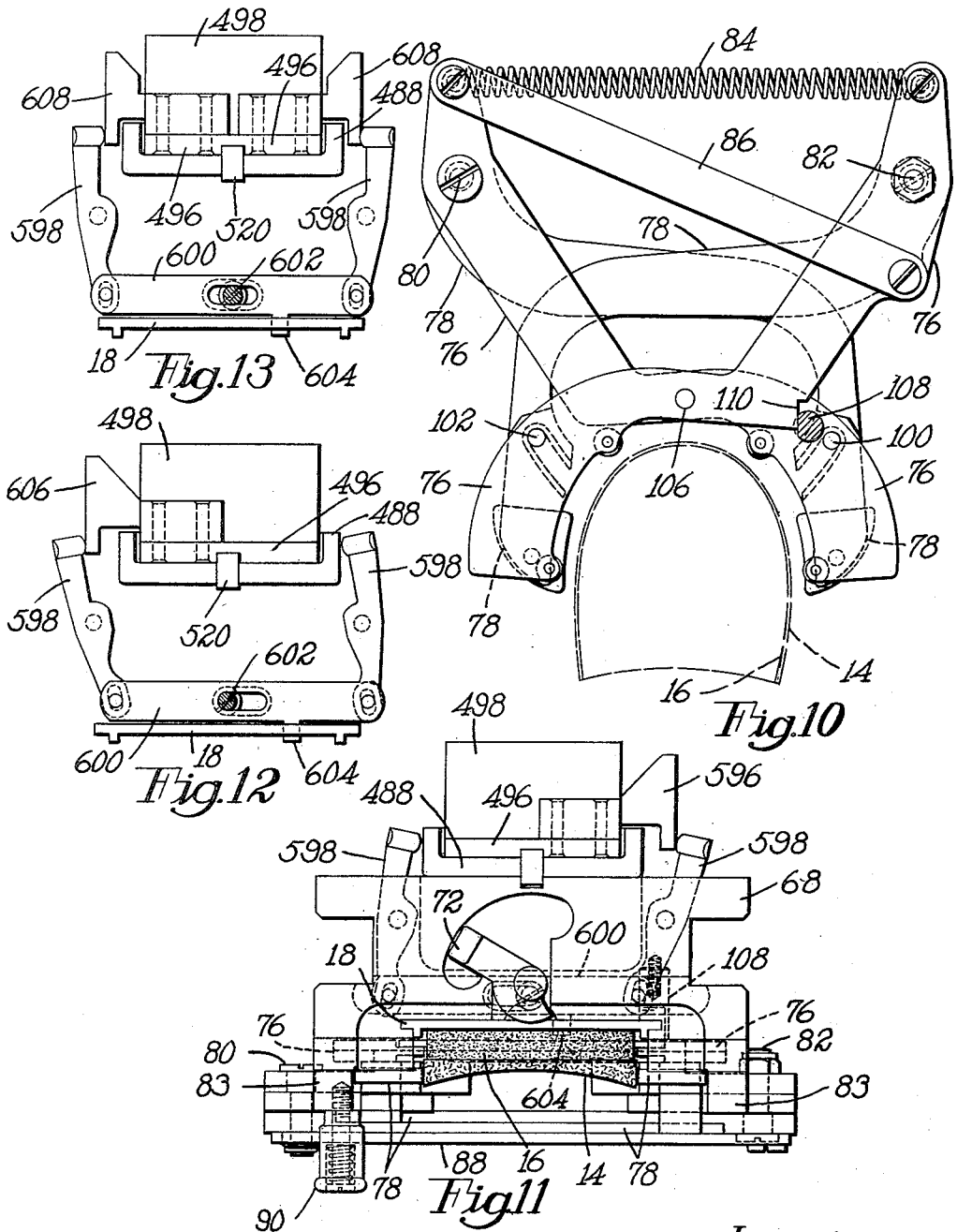

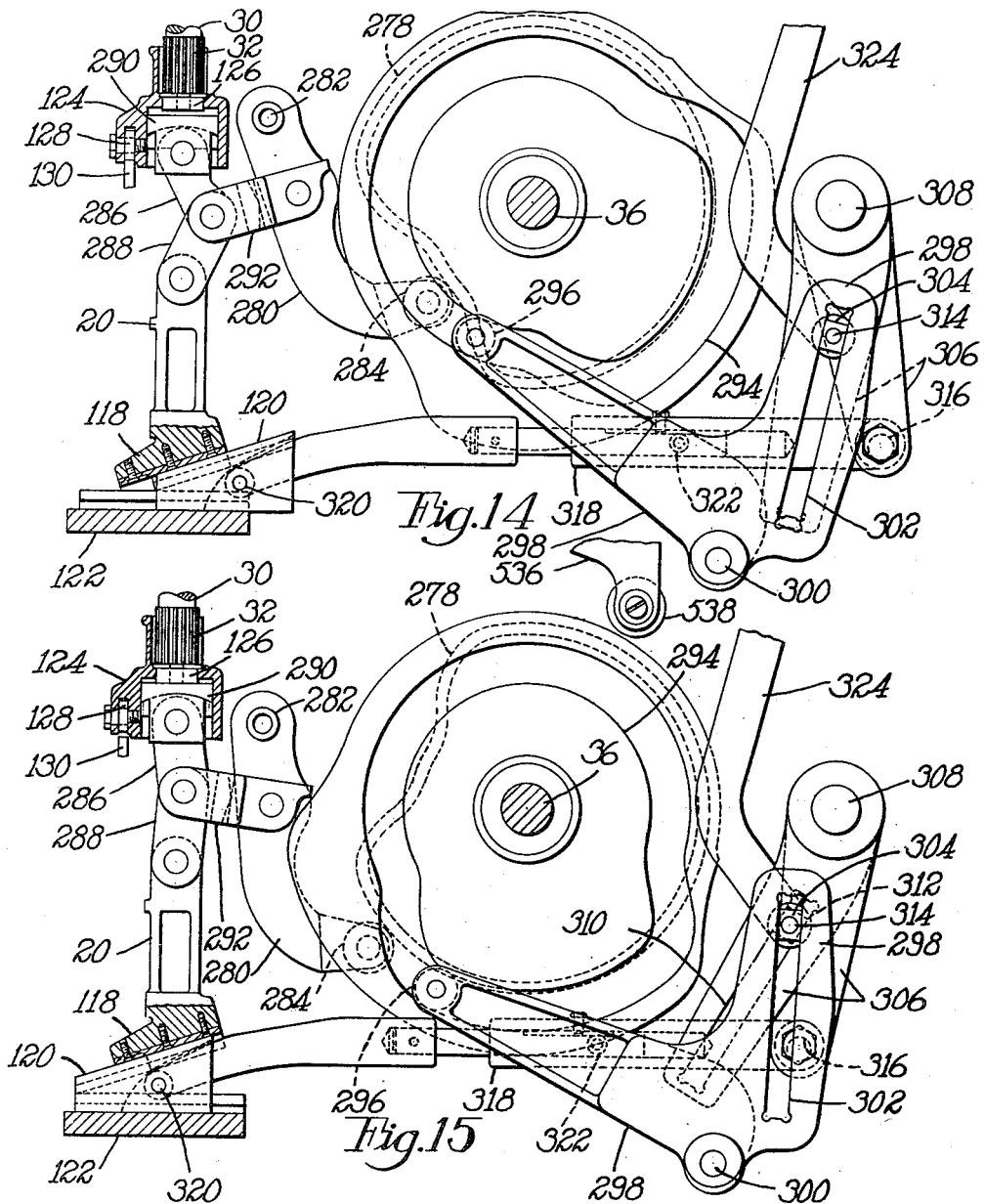

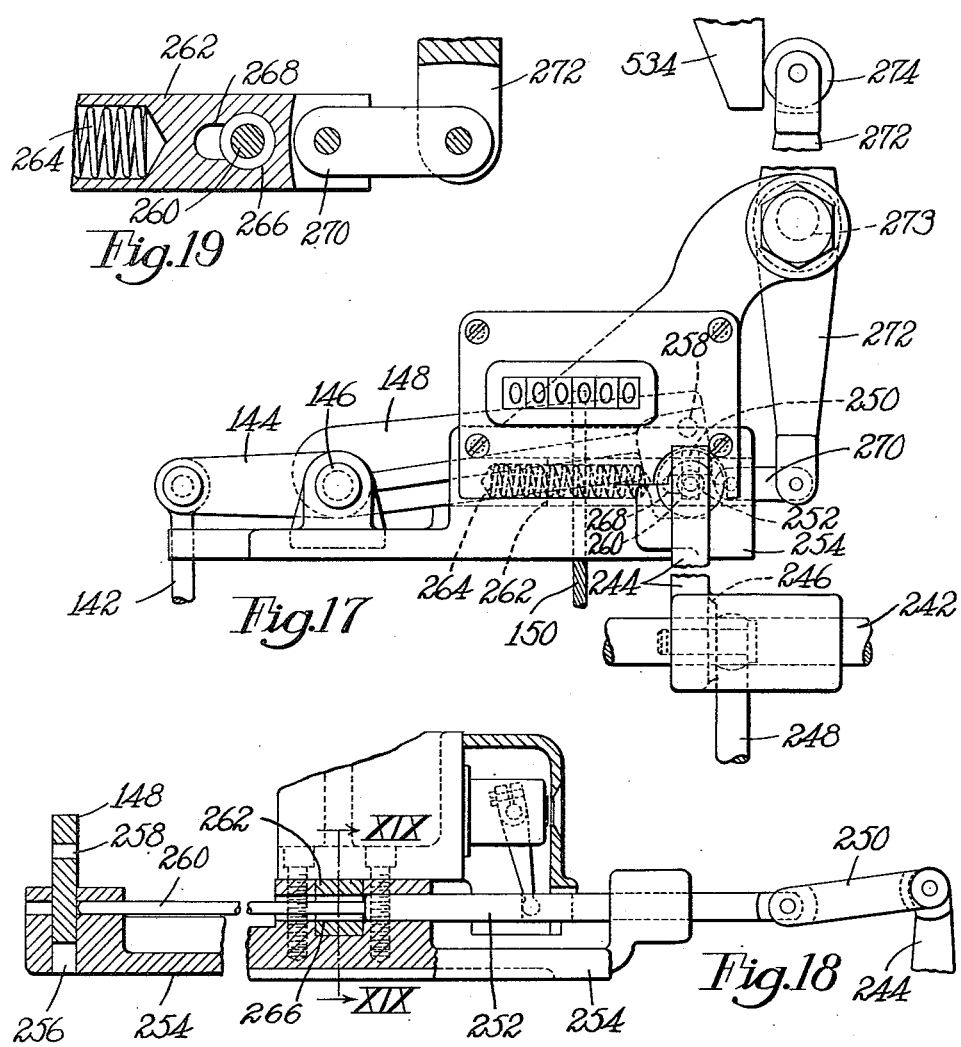

Oct. 5, 1954    H. J. WILLMOTT    2,690,560
FASTENING INSERTING MACHINE
Filed Sept. 29, 1951    18 Sheets-Sheet 9

Inventor
Herbert J. Willmott
By his Attorney

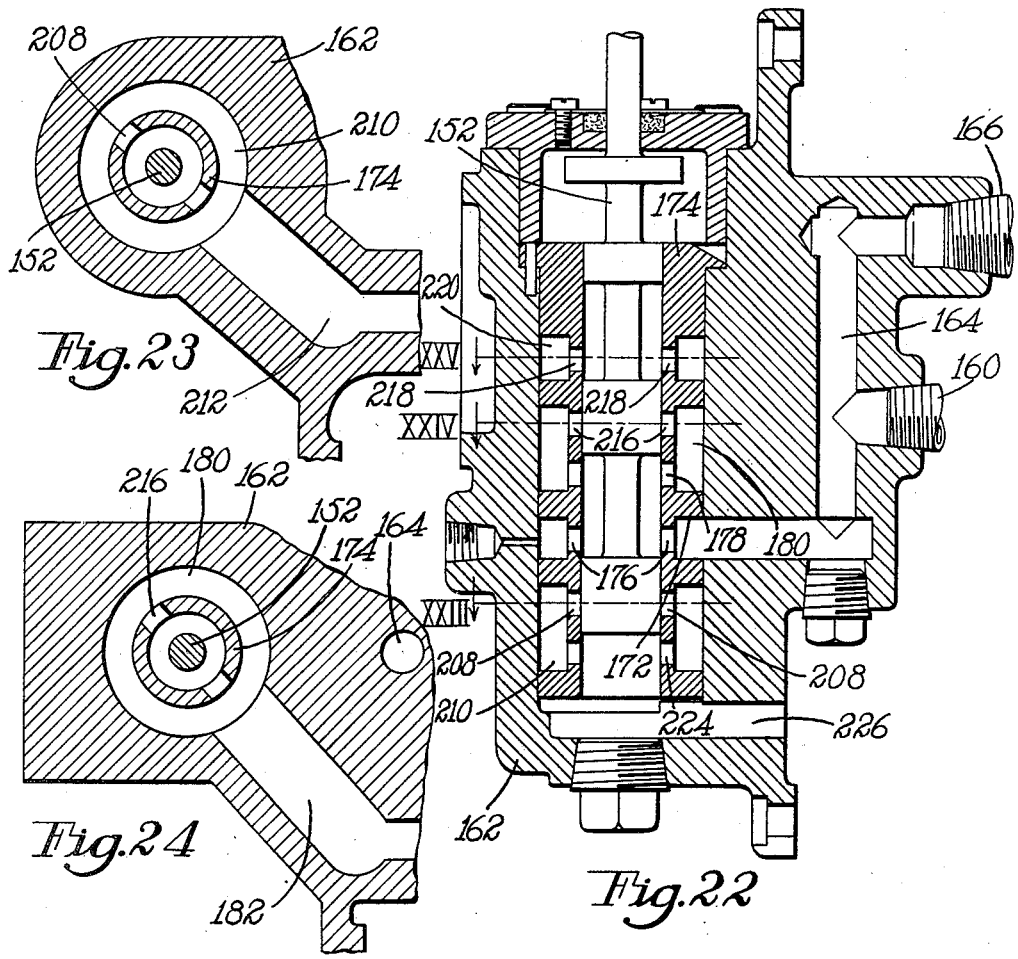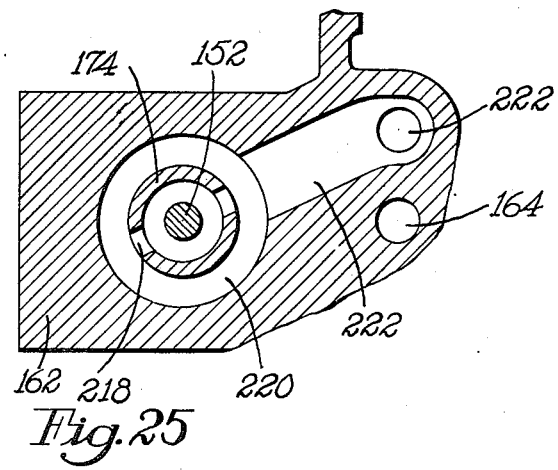

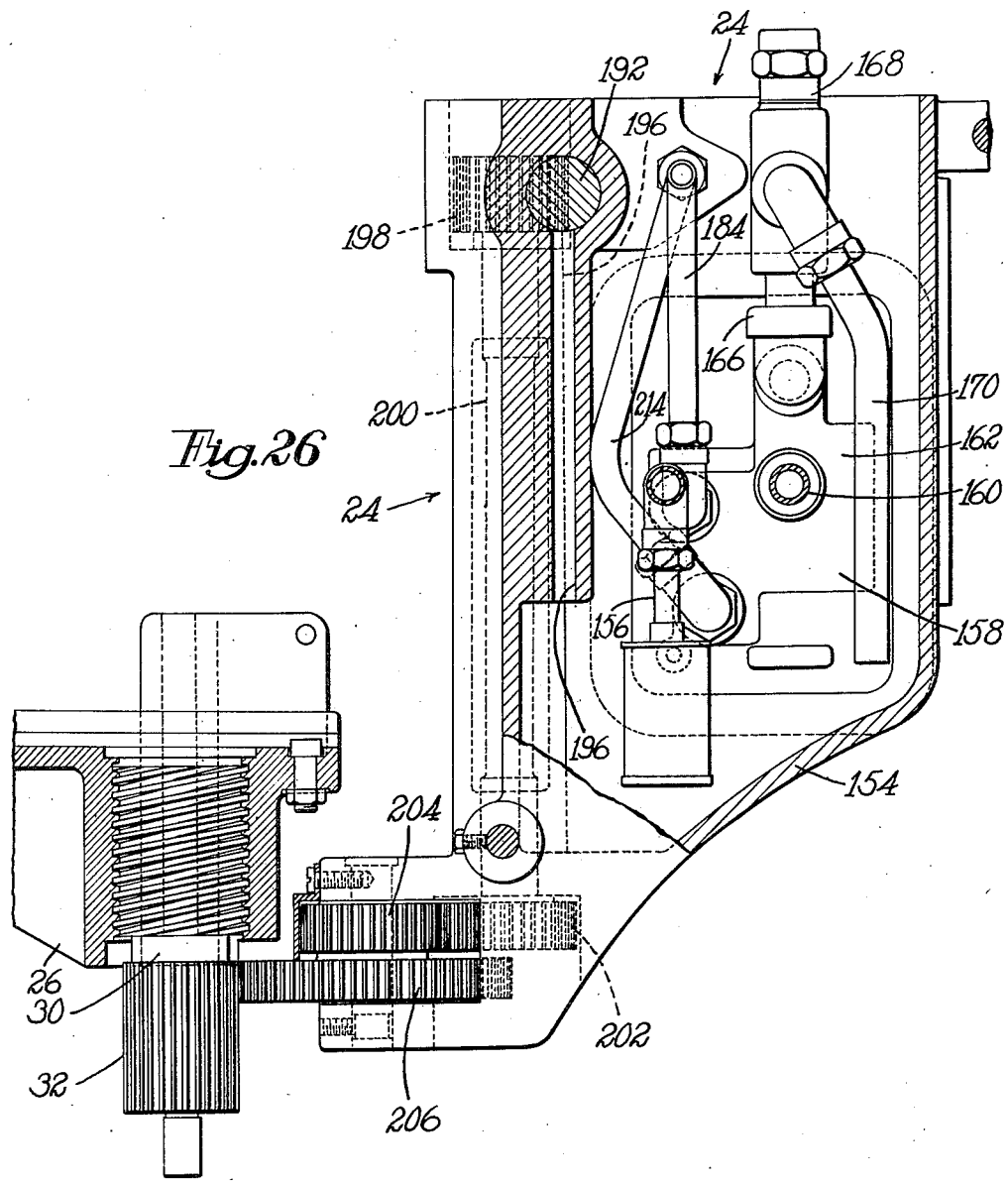

Oct. 5, 1954  H. J. WILLMOTT  2,690,560
FASTENING INSERTING MACHINE
Filed Sept. 29, 1951  18 Sheets-Sheet 12

Inventor
Herbert J. Willmott
By his Attorney

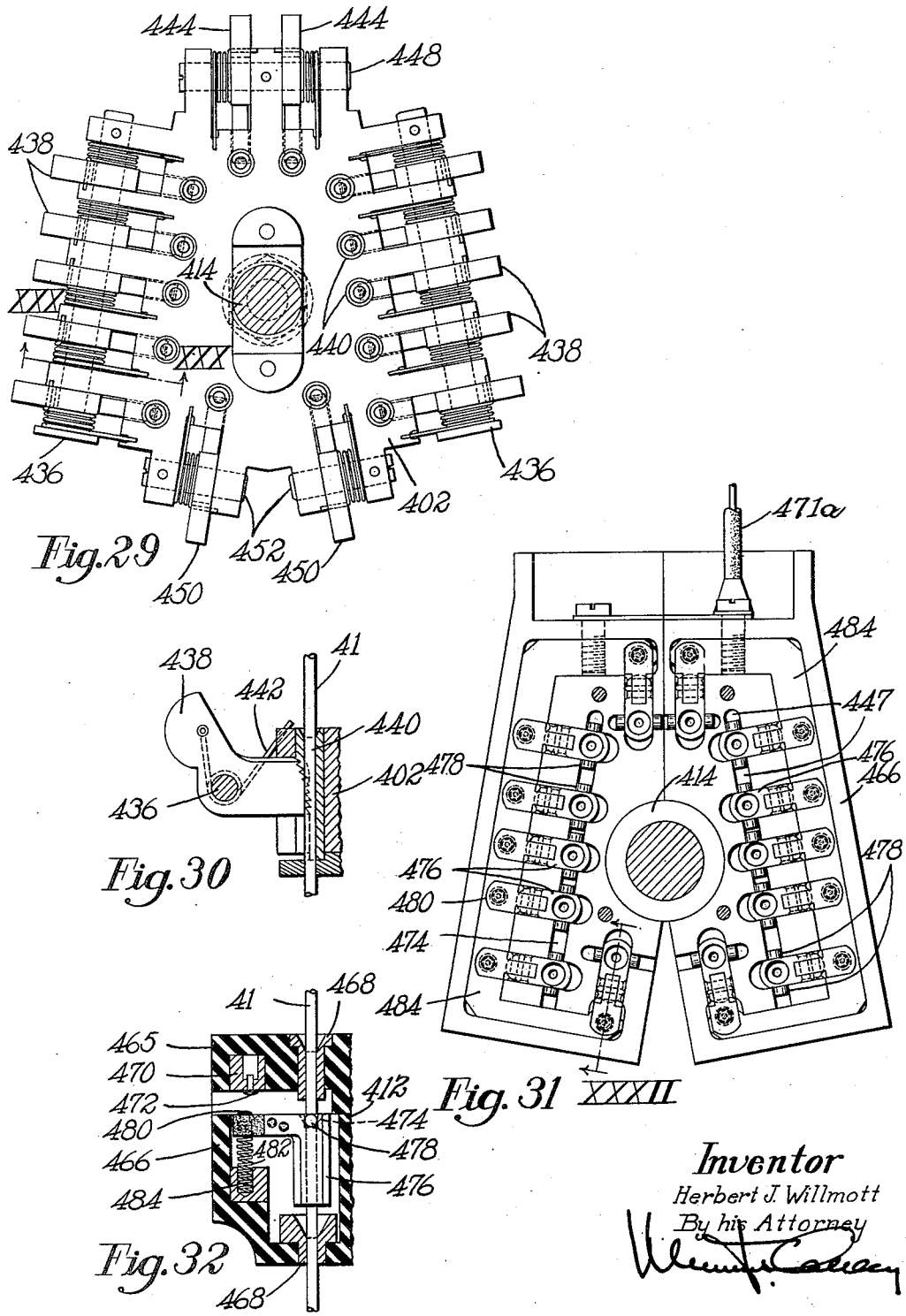

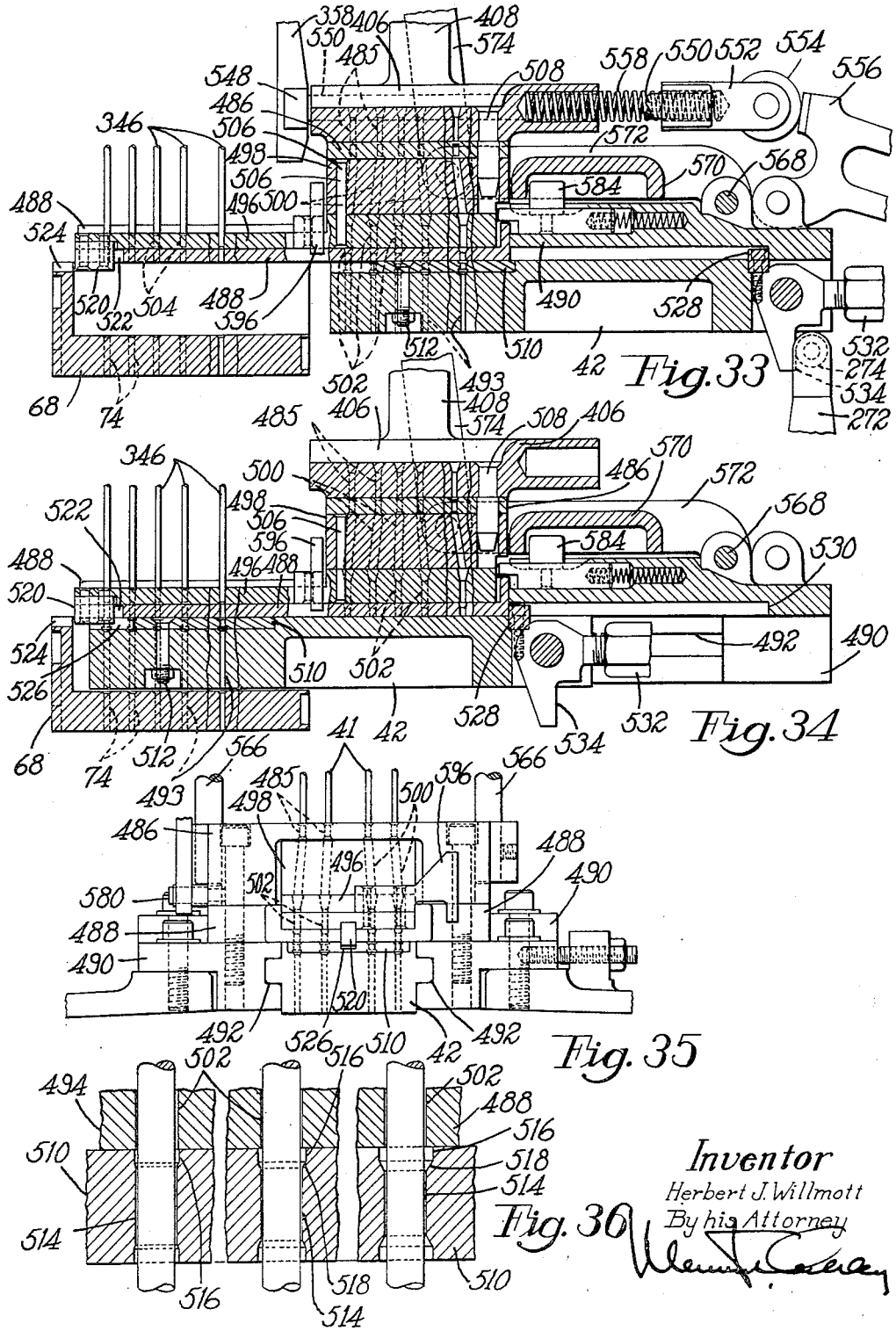

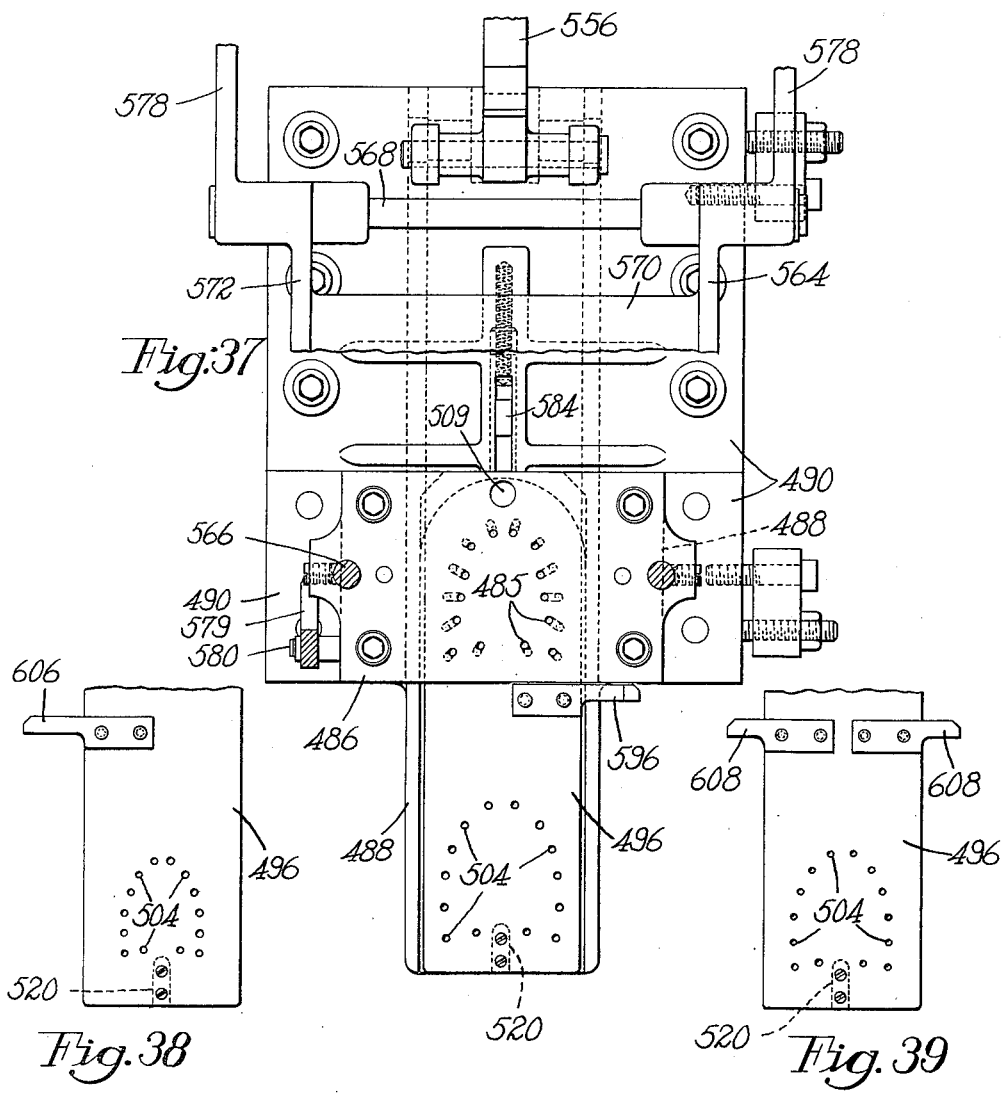

Oct. 5, 1954     H. J. WILLMOTT     2,690,560
FASTENING INSERTING MACHINE
Filed Sept. 29, 1951     18 Sheets-Sheet 17

Inventor
Herbert J. Willmott
By his Attorney

Oct. 5, 1954     H. J. WILLMOTT     2,690,560
FASTENING INSERTING MACHINE
Filed Sept. 29, 1951     18 Sheets-Sheet 18
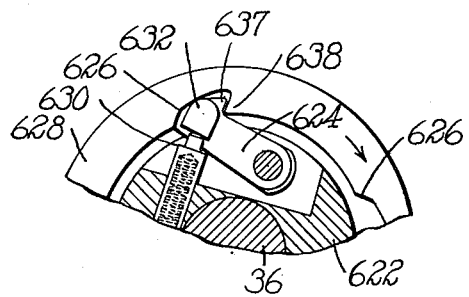
Fig.43
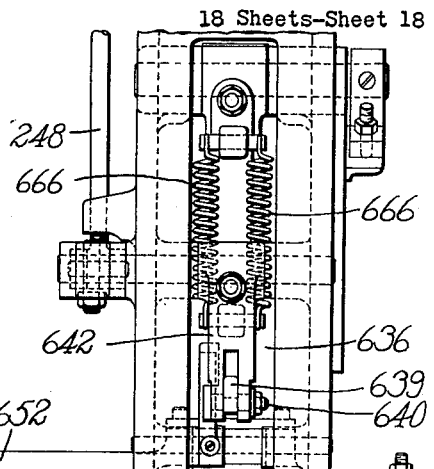
Fig.41
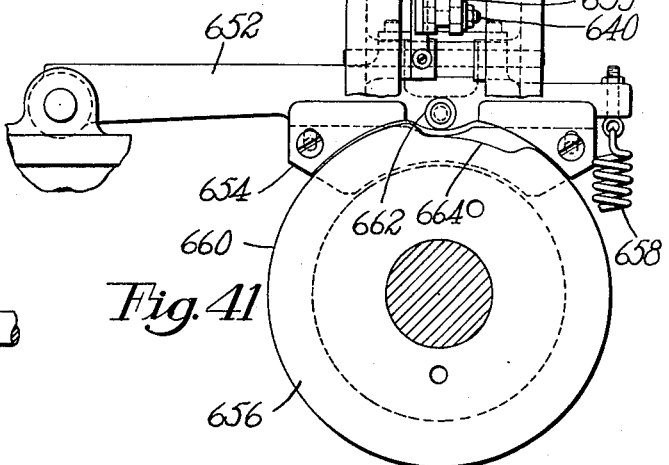
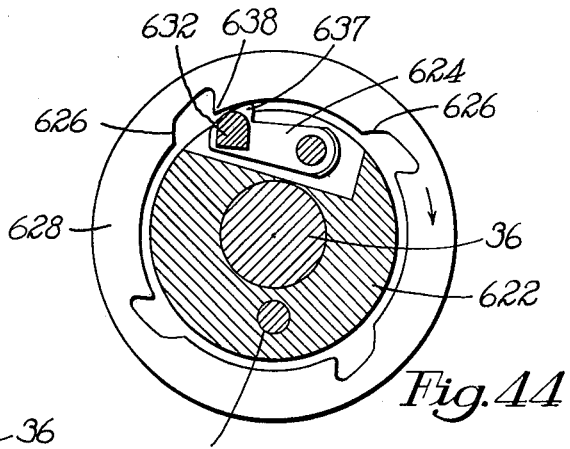
Fig.42     Fig.44
Inventor
Herbert J. Willmott
By his Attorney Patented Oct. 5, 1954

2,690,560

UNITED STATES PATENT OFFICE 2,690,560

FASTENING INSERTING MACHINE

Herbert J. Willmott, Beverly, Mass., assignor to United Shoe Machinery Corporation, Flemington, N. J., a corporation of New Jersey Application September 29, 1951, Serial No. 248,901

35 Claims. (Cl. 1—32)

This invention relates to fastening inserting machines, and is illustrated herein as embodied in a machine for attaching heels to shoes.

In the manufacture of shoes of high grade the use of metallic fastenings is avoided as much as possible. This end is materially furthered by the use of fiber pegs for attaching heel bases and top lifts to shoes. This type of fastening has the desired holding power and durability, but usually requires that the work be pricked where the fastenings are to be driven. One type of heeling machine for driving fiber fastenings employs a driver which is first moved through a pricking stroke, so as to penetrate the work to a depth equal to the length of the fastenings, and then is moved through a shorter driving stroke to drive fastenings flush with, or slightly below the surface of the work, the latter being held stationary. An example of such a machine is disclosed in U. S. Letters Patent No. 2,161,827, granted on June 13, 1939 upon an application of F. N. LaChapelle et al.

Fastenings are supplied to the driver in a machine of this type by a loading member having passages of sufficient length to accommodate the longest fastenings that are likely to be used, the length of which may be as much as an inch and a quarter. It is evident that the stroke of the driver must be at least twice this length, if it is to penetrate the work to this same depth after passing through the loading member. In fact, it is common that the driver of a machine of this type have a stroke of more than four inches.

In view of the considerable mass of the driver and its operating mechanism, it is evident that the greater their stroke the greater will be the power required, as well as the tendency toward vibration. Conversely, the shorter the stroke of the driven and its operating mechanism the faster the machine can be operated with a minimum of power and vibration.

In view of the foregoing, an object of the invention is to obtain the highest possible operating speed in a machine of this type with a minimum of vibration, and, more particularly, to obtain the desired penetration of the drivers into the work during the pricking stroke, not by an excess movement of the drivers only over that of their driving stroke, but by the combination of the minimum stroke of the drivers with a separate movement of the work toward the drivers equal to the desired depth of pricking of the work, these two movements together being adequate to provide the required relative movement between the drivers and the work for the pricking stroke.

With this object in view, the invention provides an improved heeling machine which, in accordance with one feature of the invention employs with a driver movable through pricking and driving strokes of the same length, and a work support for holding the work at the desired level for the driving stroke, means for moving the work support toward the driver, in advance of the completion of its pricking stroke, by an amount equal to the desired penetration of the driver into the work, whereby the work will be properly pricked for the reception of the fastenings. In such a construction, the driver and its operating mechanism can be designed to operate at a higher speed than would be permissible if the driver were required to move, during its pricking stroke, the additional distance, beyond the length of its driving stroke, needed for pricking the work. Moreover, since the movement of the work toward the driver, for obtaining the desired penetration of the driver into the work, is usually shorter than the stroke of the driver, the operating mechanism for raising and lowering the work support can readily be designed to accommodate the operating speed of the driver, and without having any limitting effect upon the operating speed of the driver. Smoothness in the operation of the machine is also furthered by the fact that the pricking and driving strokes of the driver are of the same length, avoiding the different accelerations which would result from alternate long and short strokes of the driver.

As in prior machines of this type, the fibre fastenings are cut from strings of fastening material which are advanced, by a string feeding device, once for each driving operation by an amount equal to the desired length of the fastenings. Having in mind that the depth to which the work is pricked is the measure of the length of the fastenings, and that this is the same as the above-mentioned stroke of the work support in the illustrated machine, the latter, in accordance with a further feature of the invention, includes connections constructed and arranged to utilize the motion of the work support to operate the feeding means for the fastening material. Accordingly, with any adjustment of the stroke of the work support to vary the depth to which the work is pricked, a corresponding change is automatically made in the stroke of the fastening-string feeding device, and the individual fastenings will always be of the proper length.

Usually, it is desired that the length of the fastenings be slightly greater than the depth to which the work is pricked, so that when the fastenings are driven flush with the work they will be upset into complete contact with the heel sections and the shoe bottom. With this object in view, provision is made in the illustrated machine, in accordance with an additional feature of the invention, for adjusting the driving connections for the string feeding means to cause the latter to move through a feeding stroke slightly longer, to any desired extent, than that of the work support.

The driving of fastenings either flush with, or slightly below the tread surface of the heel is assured by the definite relation, established by the construction of the machine, between a heel plate in the work support, engaged by the tread surface of the heel, and the drivers at the end of their driving stroke. Although the penetration of the drivers into the work during the pricking stroke is accurately measured by the movement of the work support toward the drivers, this fact alone does not insure that the bottoms of the pricked openings in the work will be in the desired relation with respect to the heel seat of the shoe, because the heel sections, being more or less resilient, are subject to a certain amount of compression under the clamping pressure. Accordingly, the relation of the heel seat of the shoe to the heel plate varies with the amount of clamping pressure employed, and the drivers may stop short of, or beyond the desired point with respect to the heel seat of the shoe, depending upon whether the clamping pressure is too light or excessive, respectively. In view of the foregoing, and in order to maintain constant the thickness of the clamped work between the heel plate and the last, the illustrated machine, in accordance with another feature of the invention, includes fluid-operated mechanism for applying a predetermined preliminary clamping pressure to the work, in combination with means for applying a final heavier pressure to the work, this means being operated with an invariable clamping movement, for any adjustment thereof, unaffected by the thickness of the work. Accordingly, the aggregate compression of the shoe parts, when they are under the final clamping pressure, is predetermined and uniform from shoe to shoe, and the relation between the ends of the drivers at the end of their pricking stroke, the heel plate and the heel seat will remain constant, regardless of variations in the thickness of the shoe parts.

The separate fastenings are severed from the strings of fastening material, at the beginning of the movement of the loader slide into register with the driver, by a shearing action between the loader slide and a fixed shear plate, each of which have fastening receiving passages arranged in the same fastening design. In order to avoid the shock and load to which the driving mechanism for the loader slide would be subjected if the severing of all the fastenings were to begin at once, provision is made, in the illustrated machine, for causing the severance of the fastenings to occur in staggered relation or at different times. To this end, and in accordance with a further feature of the invention, the loader slide, as disclosed herein, is provided with cutting edges, one for each of the cooperating cutting edges of the shear plate, which are disposed in a design or relation different from that of the cutting edges of the shear plate. Only a slightly offset relation of these cutting edges is necessary materially to reduce the cutting force required, since the greater part of the resistance to shearing is relieved well before the cooperating shearing edges pass each other. For the same reason, the total shearing force required at any time is only moderately larger than that needed to sever one fastening string, rather than a multiple of that amount based upon the total number of strings, as would be required if all the strings were to be cut at once.

In order to adapt the machine for operating upon a wide range of sizes of shoes, it is provided with three sets of interchangeable parts having fastening designs of different sizes, large, medium and small. Each set of these parts comprises a driver, a transfer plate associated with the feeding device, and a heel plate or nailing die which is associated with the jack. It is evident that the machine should not be operated unless a properly matched set of these parts has been fully assembled in the machine. In view of the foregoing, and in accordance with a further feature of the invention, the installation of matching parts of the illustrative machine is insured by the provision of indexing mechanism which prevents the complete assembly of these parts in the machine if they are not all of the same set or fastening design.

Invention is also to be recognized in various other features of the illustrative machine by which the operator of the machine is prevented from starting it through a cycle of operation, unless its interchangeable parts have been fully installed in the machine, and it has otherwise been placed in readiness for operation.

These and other features will now be described in detail in connection with the accompanying drawings and will be pointed out in the appended claims.

In the drawings,

Fig. 3 is a side elevation of the jack, and a part of the fastening inserting mechanism;

Figs. 4 and 5 are front elevations of details of the jack;

Fig. 6 is a sectional side elevation of the driver head;

Fig. 7 is a plan view of the structure of Fig. 6, from which the upper element has been removed;

Figs. 8 and 9 are plan views of the heel holding device for positioning one or more heel sections with respect to the heel plate;

Fig. 10 is a plan view illustrating the heel holders in their inoperative positions;

Fig. 11 is a front elevation of the heel holders, indexing mechanism for the heel plate, and the pressure block;

Figs. 12 and 13 are front elevations of the indexing mechanism as set for heel plates different from that shown in Fig. 11;

Figs. 14 and 15 are side elevations of the mechanisms for applying the final clamping pressure to the work, and for raising and lowering the jack frame;

Fig. 17 is an enlarged view of a part of the starting mechanism shown in Fig. 16;

Fig. 18 is a sectional front elevation of a part of the structure shown in Fig. 17;

Fig. 19 is a sectional elevation of a part of the mechanism shown in Fig. 18, the section being taken along the line XIX—XIX in Fig. 18;

Fig. 22 is a sectional front elevation of the valve shown in Fig. 20;

Fig. 23 is a sectional plan view of the valve, the section being taken along the line XXIII—XXIII of Fig. 22;

Fig. 24 is a sectional plan view of the valve, the section being taken along the line XXIV—XXIV of Fig. 22;

Fig. 25 is a sectional plan view of the valve, the section being taken along the line XXV—XXV in Fig. 22;

Fig. 26 is a side elevation of the fluid-operated mechanism shown in Fig. 20, and the driving connections between it and the jack;

Fig. 29 is an enlarged plan view of the upper pawl block shown in Fig. 28;

Fig. 30 is a sectional elevation of a detail of the upper pawl block, the section being taken along line XXX—XXX in Fig. 29;

Fig. 31 is an enlarged plan view of the switch box (the upper section having been removed) shown in Fig. 28;

Fig. 32 is a sectional elevation of a detail of the switch box, the section being taken along the line XXXII—XXXII in Fig. 31;

Fig. 33 is a sectional side elevation of the fastening forming mechanism with the loader slide in its loading position;

Fig. 34 is similar to Fig. 33 showing the loader slide in its delivery position, in register with the drivers;

Fig. 35 is a front elevation of a part of the structure shown in Figs. 33 and 34;

Fig. 36 illustrates, in sectional side elevation, the relation of the means for cutting individual fastenings from the fastening-strings when the loader slide is in its loading position;

Fig. 37 is a plan view of a part of the fastening forming mechanism;

Figs. 38 and 39 illustrate parts, characterized by different fastening designs, which are interchangeable in the structure of Fig. 37;

Fig. 41 is a side elevation of a part of the structure of Fig. 40 as viewed from the right from the line XLI—XLI of Fig. 40;

Fig. 42 is a sectional elevation of the structure of Fig. 40 as viewed from the line XLII—XLII of Fig. 40;

Fig. 43 is a sectional elevation of a detail of the clutch, the section being taken along the line XLIII—XLIII of Fig. 40;

Fig. 44 is a sectional elevation similar to Fig. 43, the section being taken along the line XLIV—XLIV of Fig. 40.

Before proceeding with a detailed description of the construction of the illustrative machine its mode of operation will first be briefly outlined.

Figure 1:
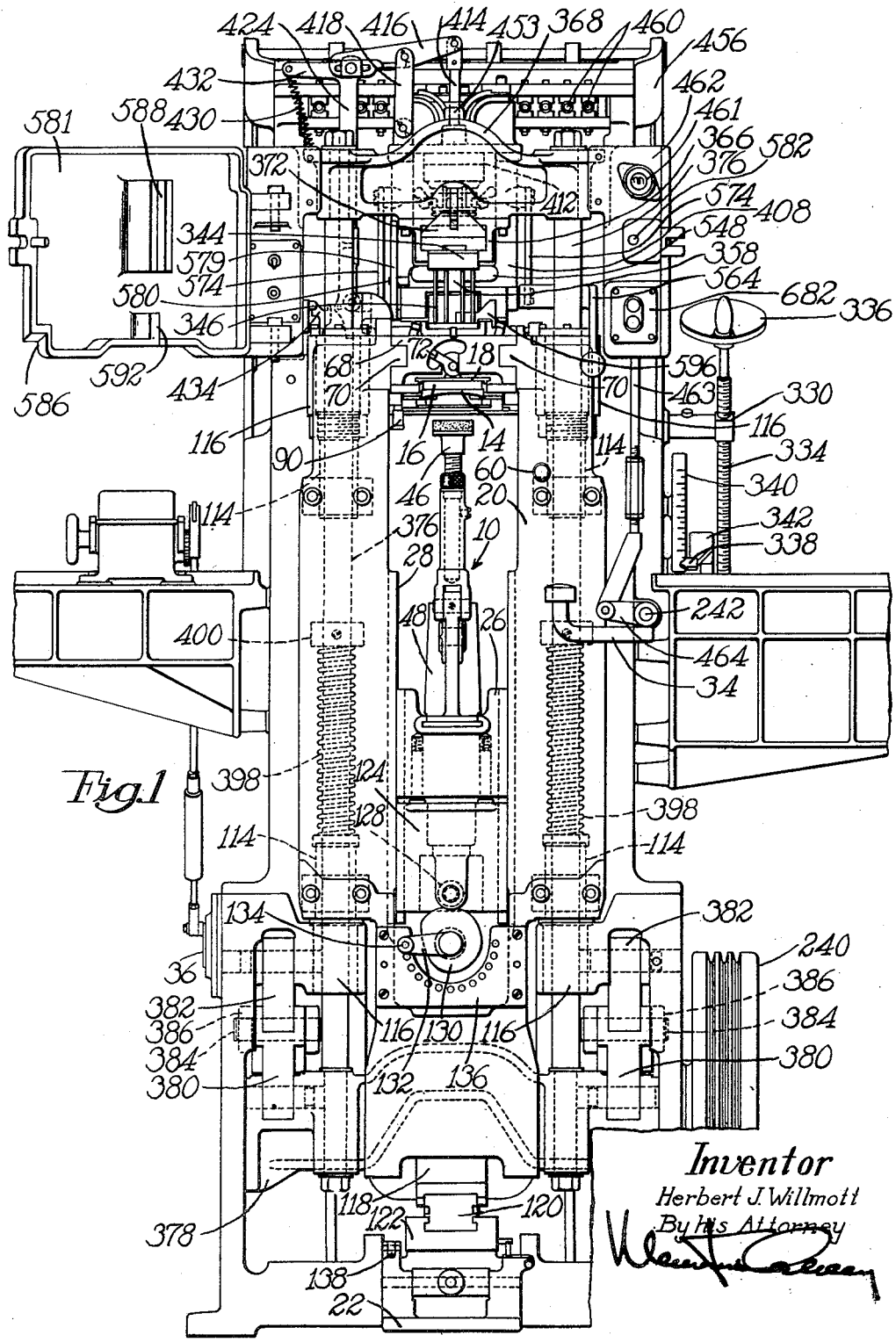
Fig. 1 is a front elevation of an illustrative machine embodying the invention.
Figure 2:
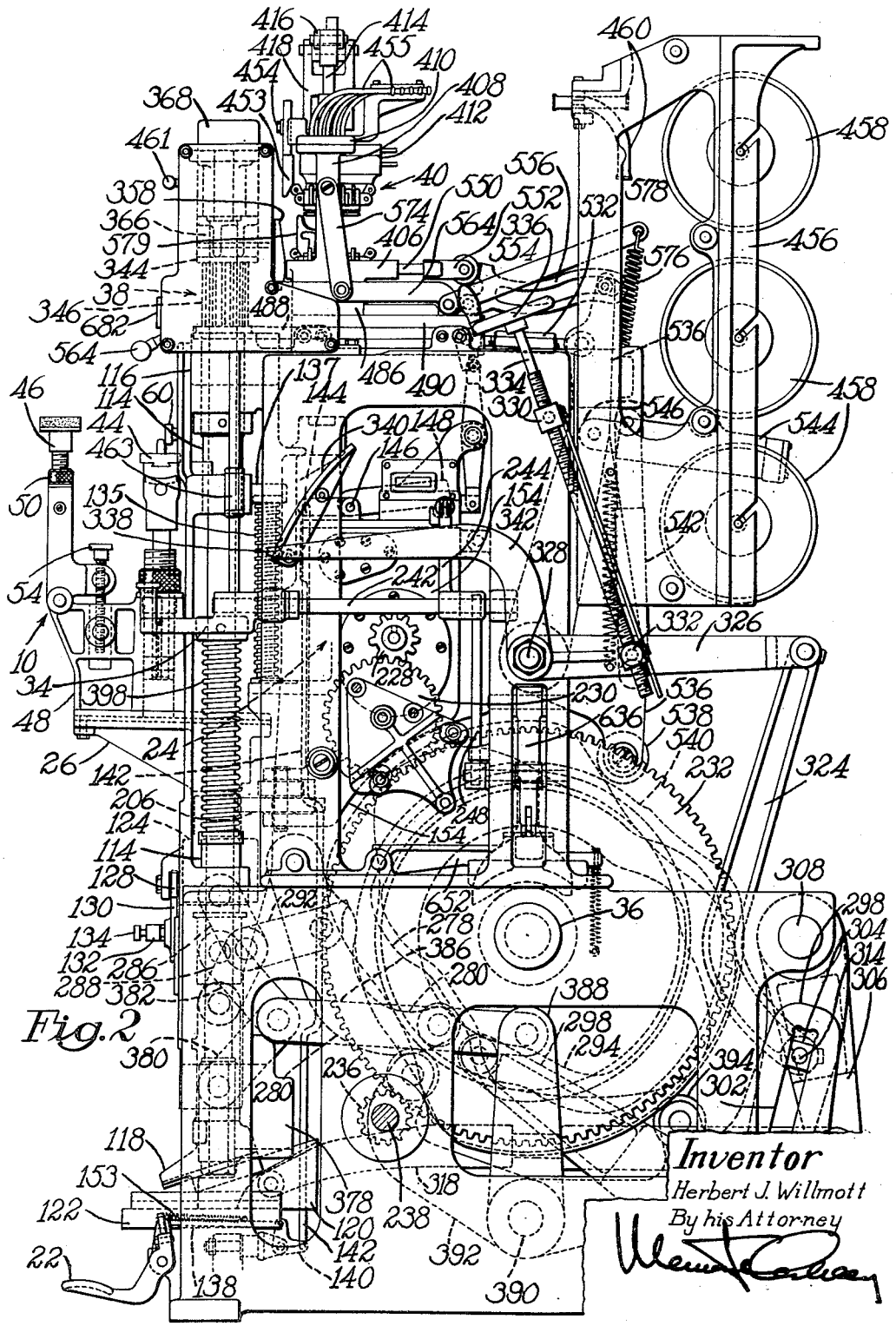
Fig. 2 is a side elevation of the machine as viewed from the right.

A lasted shoe to be operated upon is placed upon a jack 10 while the latter is in the position illustrated in Fig. 2. The jack having been properly adjusted, it is slid rearwardly to bring the heel end of the shoe into engagement with a V-shaped back gage 12 (Fig. 3) which will already have been adjusted so as to position the shoe with its heel seat alined with heel sections which are to be secured to the shoe, such for example, as a heel base 14 and top lift 16 (Figs. 1 and 11). The heel base and top lift are held in register with each other and the shoe by separate pairs of holders with the top lift in engagement with a heel plate 18 which is rigidly supported in a jack frame 20 against clamping pressure which is later to be set up between the shoe parts by bodily movement of the jack toward the heel plate. The operator now depresses a treadle 22 (Figs. 1 and 2) at the base of the machine, which actuates a fluid operated mechanism 24 (Figs. 2, 20 and 26) for raising the jack so as to apply a moderate preliminary clamping pressure to the shoe parts, this pressure being light enough to permit the operator to correct any possible misalignment of the heel sections and the shoe. To provide for this movement of the jack it is mounted upon a bracket 26 (Fig. 1) which slides vertically in ways 28 formed in the jack frame 20. The bracket is raised to apply the preliminary pressure, and later, near the end of a cycle of operation of the machine, is lowered to relieve this pressure, by a shaft 30 (Figs. 26, 14 and 15) the upper end of which is threaded into the bracket. The lower end of this shaft is provided with an elongated pinion 32 which is geared to the fluid operated mechanism 24 (Figs. 2 and 26). After the preliminary clamping pressure has been applied, the machine is operated through one complete cycle during which a heavier clamping pressure is applied to the work, the work is pricked where it is to receive the fastenings, a gang of fastenings is driven simultaneously through the heel sections and into the heel seat of the shoe, and finally, the clamping pressure on the shoe is relieved so that the shoe can be readily removed from the machine.

The machine is thus actuated by depressing a starting lever 34 (Fig. 1), which trips a one-revolution clutch mechanism 35 (Fig. 40) for driving a main drive shaft 36 through one complete revolution for each actuation of the lever 34. The above-mentioned pricking and driving operations are performed by fastening inserting mechanism comprising a driver head 38 (Fig. 3), which is moved toward and away from the shoe twice during each cycle of operation of the machine, both strokes of the driver head being of the same length.

It will now be convenient to describe the action of the fastening inserting mechanism, throughout one cycle of operation of the machine, as a basis for describing the other operating characteristics of the machine in their proper relation. The angles to be referred to are approximate. After the starting lever 34 has been depressed, the drive shaft 36 rotates through 30° before any movement of the driver head 38 occurs, the driver head at this time being in its upper position. During the next 90° of rotation of the drive shaft, the driver head is lowered through its pricking stroke and is immediately returned again to its upper position, where it remains during the succeeding 90° of rotation of the drive shaft. During the next 90° of rotation of the drive shaft, the driver head is lowered through its driving stroke and is immediately returned to its upper position, where it rests throughout the remaining portion of the revolution of the drive shaft. It will now be observed that, for each cycle of operation of the machine, the events in the operation of the driver head are as follows: (1) a preliminary dwell, (2) consecutive pricking and pricking return strokes, (3) an intermediate dwell, (4) consecutive driving and driving return strokes, and (5) a short final dwell.

The jack frame 20 and the shoe are supported at such a height, during the driving stroke of the driver head, that the fastenings are driven flush with the heel. If it is desired that the fastenings be driven beyond the tread surface of the heel, a thinner heel plate 18 is used, without varying the position of the jack, which causes the work to be supported at a higher level in the jack than is the case when the thicker heel plate, for flush driving, is used.

Figure 16:
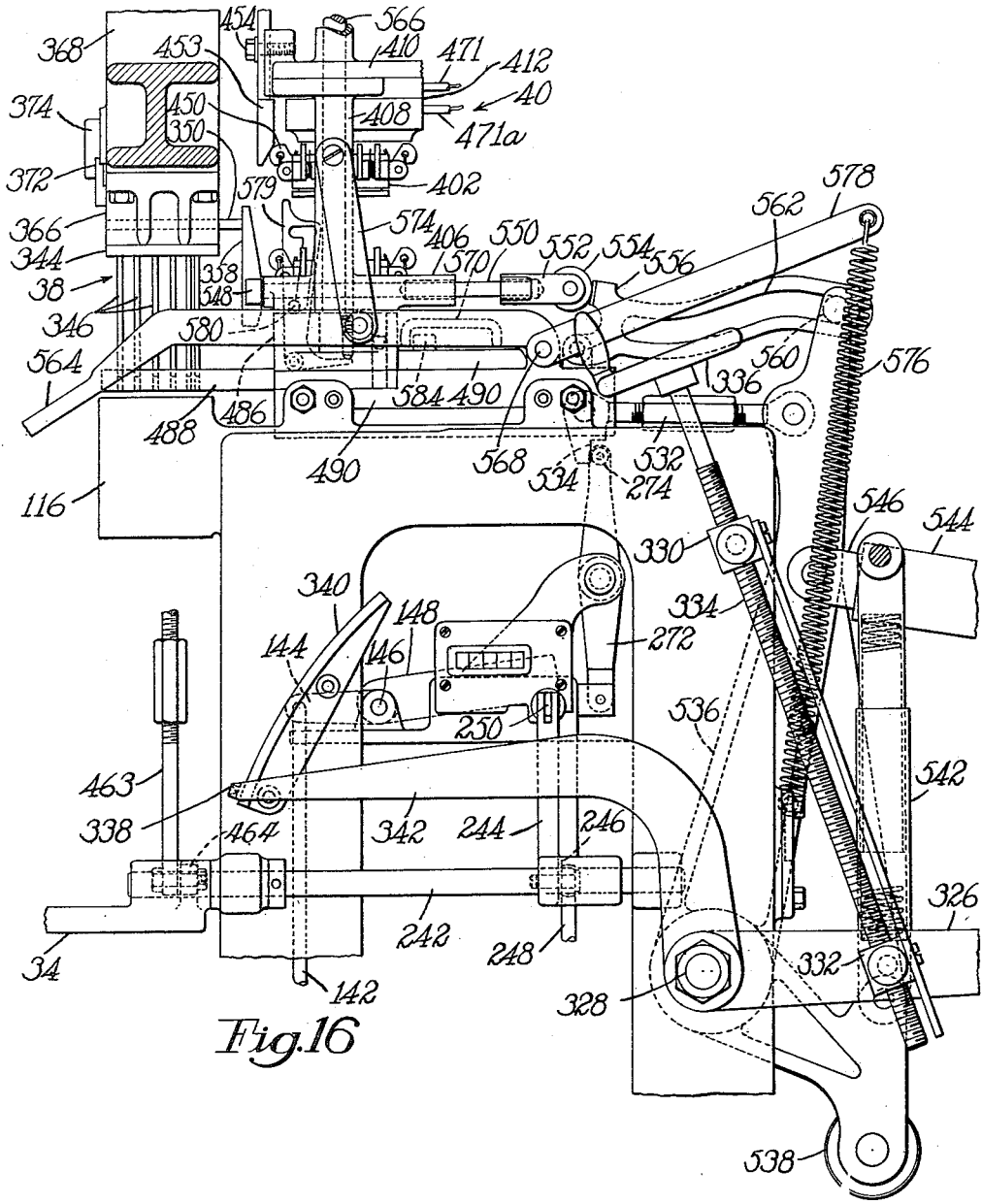
Fig. 16 is a side elevation illustrating the fastening feeding and supplying mechanism, and a portion of the starting mechanism.
Figure 28:
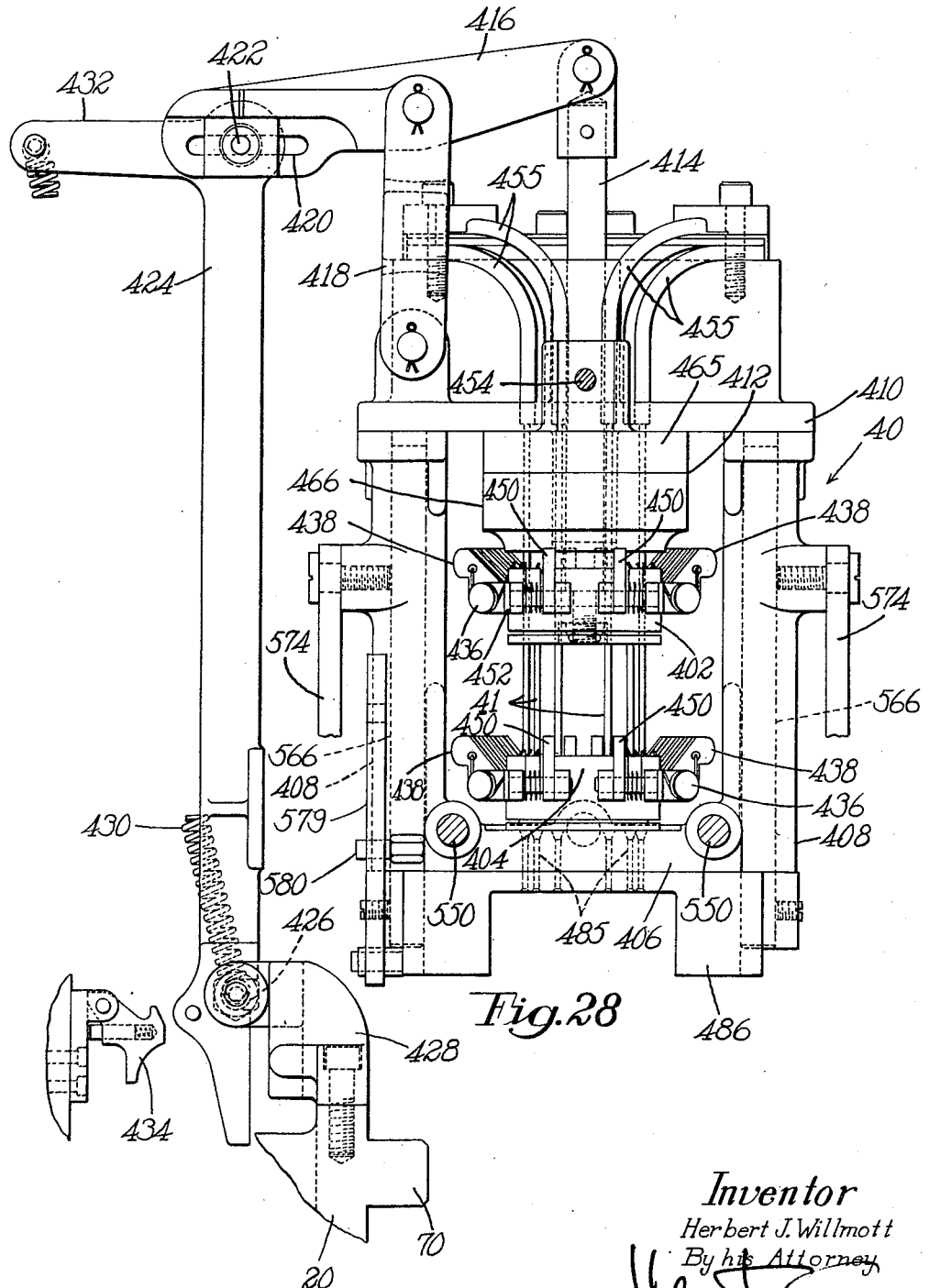
Fig. 28 is a front elevation of the fastening-string feeding device.

During the preliminary dwell of the driver head 38 the jack frame 20 is raised above its normal driving position described above, through a distance equal to the desired penetration of the drivers into the work, so as to bring the work within the path of the drivers during the pricking stroke. At the same time, pressure is exerted upon the lower end of the pinion 32 (Fig. 15) which causes heavy clamping pressure to be applied to the work. In addition, a fastening-string feeding device 40 (Figs. 2, 16 and 28) is operated, by connections joined to the jack frame, to feed fastening strings 41 into a loader slide 42 (Fig. 35), the length of this feeding movement being equal or proportional, as desired, to the upward movement of the jack frame. The pricking stroke of the driver head now takes place, and is immediately followed by the pricking return stroke, at the end of which the driver head is returned to its upper position where it remains during the above-mentioned intermediate dwell.

During this dwell the jack frame and the work are lowered to their normal driving position, this movement being accompanied by a retractive movement of the string feeding device, and in addition, the loader slide 42 is advanced from its loading position (Fig. 33) into its delivery position (Fig. 34), in register with the drivers and the heel plate. With the loader slide in this position, the driver head is moved through its driving stroke, during which the fastenings are driven out of the loader slide, through the heel plate, and into the perforations in the work made during the pricking stroke of the driver head. On the completion of the driving return stroke of the driver head, which immediately follows its driving stroke, the loader slide is retracted into its loading position beneath the feeding device, and the clamping pressure upon the work is relieved permitting the finished work to be readily removed from the jack.

The illustrated jack 10 is substantially the same as that disclosed in the Pope Patent No. 1,552,504, granted on September 8, 1925. Briefly, this jack comprises a heel post 44 (Fig. 3), a toe post 46, and the back gage 12 mentioned above. These parts are carried by a slide 48 which is arranged to move horizontally, in slideways in the bracket 26, from a loading position (Fig. 2) into its operative position, as illustrated in Fig. 3. Heightwise adjustments of the toe and heel posts may be made by turning nuts 50 and 52, respectively, and angular adjustment of the toe post, according to the length of the shoe, can be made by turning a screw 54. The back gage 12 is adjusted heightwise and laterally by turning a nut 56, and adjusting screw 58, respectively. Adjustment of the back gage toward and away from the heel post is effected by turning a knob 60 (Figs. 1 and 2) protruding from the front of the jack frame, the knob being connected by a flexible cable 62 (Fig. 5) to a bevel gear 64 which meshes with another gear 66 threaded upon a rod 68. Further description of the details of the jack is unnecessary for an understanding of the present invention, but may be found in the above-mentioned Pope patent.

The heel plate 18 is received in a channel formed at the bottom of a pressure block 68 (Figs. 1 and 11), the sides of which are grooved to receive tongues 70 which are integral with the jack frame 20. The machine is provided with heel plates having fastening receiving passages arranged in fastening designs of three different sizes appropriate for an entire range of shoe sizes. The plates are also provided in two different thicknesses, so that the fastenings may be set either flush or "blind." Each heel plate may be readily slid in and out of the pressure block, and is held therein by a latch 72 which, as will be described later, is a part of a safety device for preventing the machine from being operated unless the plate has been fully inserted into the block. The pressure block is provided with three different sets of passages 74 (Fig. 3) each set of passages corresponding to one fastening design.

A top lift or heel base separately, or both together, are supported and positioned in the desired relation to the heel plate, independently of the shoe, by a holder similar to that disclosed in United States Letters Patent No. 2,408,844, granted on October 8, 1946, upon an application of E. C. Gill. The illustrated holder comprises an upper pair of arms 76, 76 (Figs. 8, 9 and 10) arranged to position the top lift, and a lower pair of arms 78, 78 which are arranged to position the heel base. The right and left arms of each pair are pivotally mounted upon eccentric studs 80, 82, respectively, which are fixed to a U-shaped plate 83 attached to the lower side of the pressure block. Springs 84, 84 connect the rear ends of the arms causing them to grip the heel sections inserted between them. A link 86, connecting the arms 76, 76, equalizes their movements toward and away from each other, and a similar link 88 connecting the lower arms 78, 78 has a similar equalizing effect upon these arms.

If a heeling operation involves the fastening of either a top lift or heel base alone to the shoe, the lower arms 78 may be held in their inoperative positions, as illustrated in Fig. 8, by the use of a spring-pressed detent 90 which is mounted upon the plate 83, and has an arm 92 carrying a pin 94. The lower arms 78 are provided with slots 96, 98 which are concentric with the studs 80, 82, respectively, and the above-mentioned pin 94 is adapted to be received in the slot 98 to hold the arms 78 in their retracted positions. When the detent 90 is not in use, closing movement of the arms 78 is limited by the engagement of pins 100, 102, projecting downwardly from the upper arms 76, with the closed ends of the slots 96, 98 respectively. The closing movement of the upper arms 76 is limited by the engagement of a pin 106, carried by the left-hand arm 76, with the closed end of an arcuate slot 104 in the heel plate which is concentric with the stud 82. The above described pin and slot connections are so designed that the arms will be spread only slightly from their closed positions by the insertion of heel sections between them.

When there is no heel plate in the machine, the upper arms 76 may be held in their separated, inoperative positions by a spring-pressed detent 103 (Figs. 10 and 11) which is mounted to slide vertically in the pressure block 68, and is arranged to overlap and engage a shoulder 110 on the left-hand arm 76. Moreover, at such times the lower arms 78 are also held in their separated, inoperative positions by the engagement of the pins 100, 102 with the closed ends of the slots 96, 98 respectively. However, when a heel plate 18 is assembled into the pressure block, a cam surface 112 (Fig. 8) formed near the right rear corner of the plate, and sloping downwardy toward the rear thereof, engages a matching cam surface upon the detent 108, and lifts it away from the shoulder 110, thereby permitting the arms to close until such movement is limited by the bottoming of the pin 106 in the slot 104.

The slots 104 are of different lengths in the various heel plates 18, according to the size of their fastening designs, so that automatically upon the insertion of any heel plate into the pressure block, the arms will be properly positioned not only to receive conveniently that size of heel, or heel base, corresponding to the size of the fastening design of the selected heel plate, but also to avoid any possibility of the arms closing enough to cause interference with the drivers, if the machine is operated with no heel section in the holder, or without using the detent 90.

To remove the heel plate 18 from the machine, the arms 76, 78 are manually separated, and the pin 106 in the left-hand arm 76 is moved out of the arcuate slot 104 in the heel plate, permitting the plate to be withdrawn from the machine. As soon as the cam surface 112 moves away from the detent 108, the latter drops, first into engagement with the upper surface of the left-hand arm 76, and later, over the shoulder 110 when the arm has been moved far enough. Thus, the arms 76 and the arms 78 also are now held in their retracted positions until the detent 108 is again lifted by the insertion of a heel plate into the machine.

The jack frame 20 is mounted for vertical movement upon four bushings 114 (Figs. 1 and 2) which are fixed in lugs 116 extending forwardly from the front of the machine frame. The jack frame at its base is provided with a foot 118 having a sloping surface which seats upon a wedge 120. This wedge is mounted to slide forwardly and rearwardly of the machine, in order to raise and lower the jack frame, in a holder 122 effectually integral with the frame of the machine. The wedge is moved from its normal rearward position (Figs. 2 and 14), when the jack frame and the parts carried thereby are supported at the proper height for the driving operation, into its forward position (Fig. 15), in advance of the end of the pricking stroke of the drivers, so as to elevate the work to the extent required to cause the drivers to prick the work to the desired depth. The mechanism for thus operating the wedge will be described in detail later.

Immediately below the bracket 26, which supports the jack 10, there is a crosshead 124 (Figs. 1, 14 and 15) mounted to slide vertically upon the jack frame on the ways 28. Until the final heavy clamping pressure is applied to the work, the crosshead supports the bracket 26 and the jack carried thereby, through the shaft 30, the lower end of which at the base of the pinion 32 seats upon a thrust bearing 126 which is mounted in the crosshead 124. The crosshead is supported at variable heights in the jack frame, before the final clamping pressure is set up, by connections comprising a roll 128 carried by the crosshead, and a cam 130 which is rotatably mounted upon the jack frame. An arm 132 fixed to the cam has, at its outer end, a detent 134 adapted to be received in any one of a series of holes in a plate 136 which is fixed to the jack frame. This adjustment of the cam is for the purpose of controlling the amount of the final clamping movement of the jack and the final clamping pressure which is applied to the work, as will be more fully described later. The weight of the jack frame and the parts carried thereby is partially counterbalanced by a spring 135 (Fig. 2) which is compressed between a shoulder on the machine frame and a lug 137 integral with the jack frame.

Figure 20:
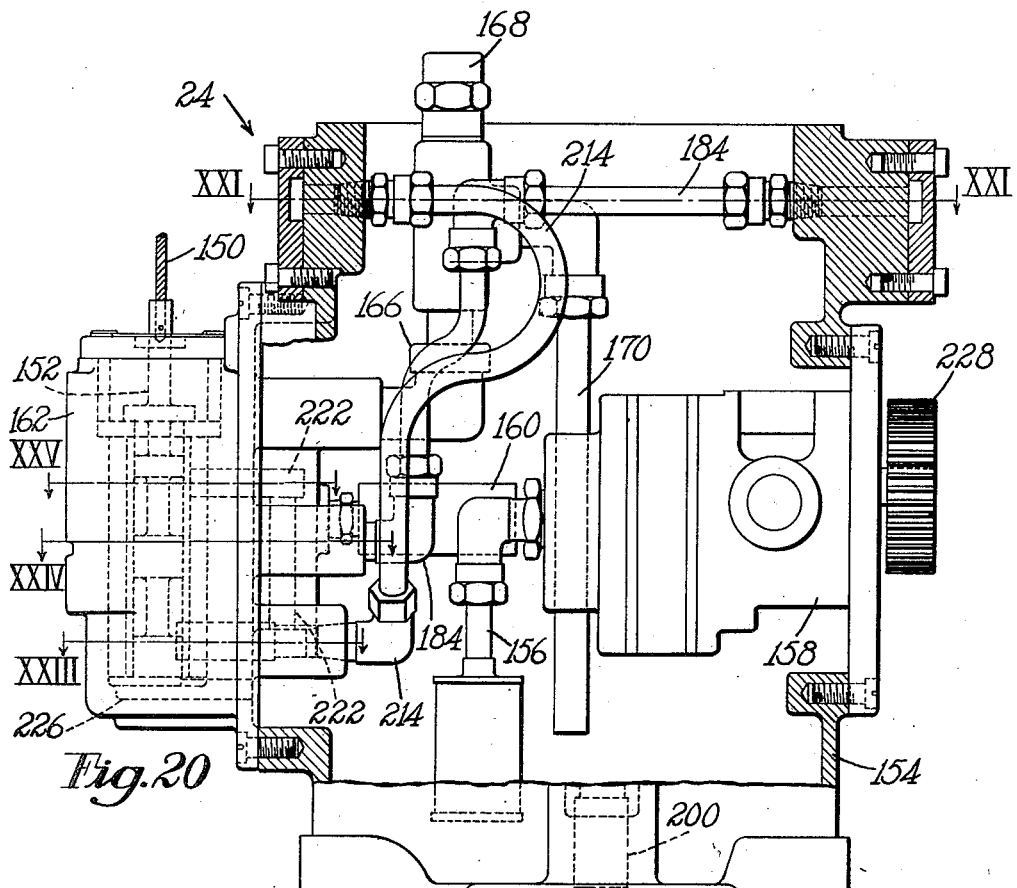
Fig. 20 is a front elevation of the fluid-operated mechanism for applying the preliminary clamping pressure.

To cause the preliminary clamping pressure to be applied to the work, the operator depresses the treadle 22 which causes the fluid-operated mechanism 24 to be actuated through the following connections. The treadle is connected by a link 138 to a bell crank lever 140, this lever being arranged to lift a rod 142 when the treadle is lowered. This rod is joined to an arm 144 which is fixed to one end of a rockshaft 146 the other end of which shaft has fixed on it an arm 148 (Fig. 17). A cable 150 fixed to the arm 148 near its rearward end is connected to the shank of a valve piston 152 (Fig. 20) which controls the operation of the above-mentioned fluid-operated mechanism 24. When the treadle 22 is released, the valve piston rises to its inoperative position, as shown in Fig. 22, under the influence of a spring 153 (Fig. 2) stretched between the treadle and the frame of the machine; but when the treadle is depressed, the piston is lowered into its operative position, as shown in Fig. 20, and causes, through the mechanism next to be described, the shaft 30 (Figs. 14 and 26) to be rotated in a clockwise direction (when viewed in plan), whereby the bracket 26 and the jack 10 are elevated to apply preliminary clamping pressure to the work.

Figure 21:
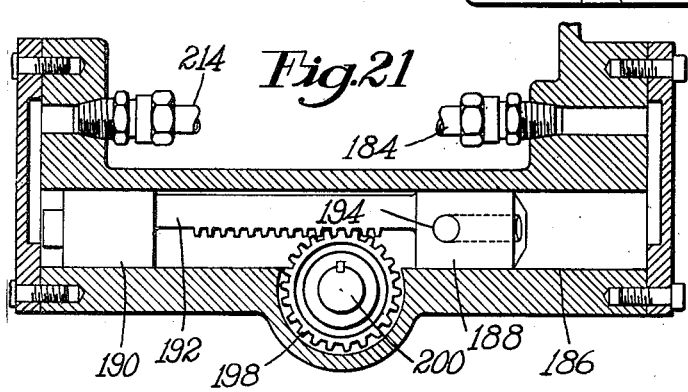
Fig. 21 is a sectional plan view, the section being taken along the line XXI—XXI of Fig. 20.

The fluid-operated mechanism 24 (Figs. 20, 22 and 26) comprises a housing 154 the lower portion of which serves as a sump tank. Oil is drawn from the tank into an intake pipe 156 by a pump 158 which discharges the oil, under pressure, through a pipe 160 into a valve casing 162. When the valve piston 152 is in its inoperative position, the bulk of the oil delivered by the pipe 160 passes through a duct 164 in the casing 162 to a pipe 166 leading to a pressure relief valve 168, from which the oil exhausts into the sump tank through a pipe 170. The duct 164 also leads to a peripheral groove 172 (Fig. 22) formed in a sleeve 174 within which the valve piston slides. With the valve piston in its inoperative position, oil passes through a series of ports 176, then upwardly through another series of ports 178, and into a peripheral groove 180 in the sleeve which is connected, by means of a duct 182 (Fig. 24) formed in the casing 162, to a pipe 184. This pipe leads to one end of a cylinder 186 (Fig. 21) within which slides a plunger having pistons 188, 190 connected by a rack bar 192. Normally, when the valve piston is in its inoperative position (Fig. 22) fluid pressure supplied to the piston 188 through the pipe 184 urges the plunger to the left, as illustrated in Fig. 21. In order to insure a voidless supply of fluid to the piston 188, a small area of this piston is vented by a duct 194 which leads into a vent passage 196 (Fig. 26) formed in the housing 154, which returns this vented oil downwardly to the sump tank.

When the treadle 22 is depressed, and the valve piston 152 is lowered into its operative position, fluid pressure is delivered against the piston 190 which, with the rack bar 192, is moved to the right (Fig. 21), the valve also being so arranged that the fluid adjacent to the piston 188 is exhausted into the sump tank. Such operation of the rack bar 192 results in the rotation of the shaft 30, and the application of preliminary clamping pressure to the work through mechanism including a gear 198 in mesh with the rack bar, and a vertical shaft 200 (Fig. 26) to which the gear is fixed. The remaining parts of this mechanism consist of a gear 202 fixed to the lower end of the shaft, and a pair of gears 204, 206, which are fixed to each other and are arranged to mesh with the gear 202, and the above-mentioned pinion 32, respectively.

With the valve piston 152 in its operative position, fluid passes from the ports 176 (Fig. 22) through other ports 208, and thence into a peripheral groove 210 in the sleeve 174 which is joined by a duct 212 (Fig. 23) with a pipe 214 (Fig. 20) which directs the fluid to the piston 190. When, in response to this fluid pressure, the rack bar is moved to the right (Fig. 21), the fluid adjacent to the piston 188 is exhausted through the pipe 184, the duct 182, the groove 180, and thence through the ports 216, 218, the latter leading to another peripheral groove 220 formed in the sleeve 174. This groove is connected to a duct 222, formed in the casing 162, which returns the oil to the sump tank.

When the valve piston is raised to its inoperative position, and fluid pressure is applied against the piston 188 to move it to the left, the fluid adjacent to the piston 190 is exhausted through the pipe 214 into the groove 210, and thence through ports 224 in the sleeve 174, which lead to a duct 226 formed in the casing 162 and arranged to drain the oil into the sump tank.

The pump 158 is continuously driven by a gear 228 (Fig. 20) which is fixed to the pump shaft, this gear being driven by an idler gear 230 (Fig. 2) which is rotatably mounted upon a bracket fixed to the frame. The gear 230 is driven by another gear 232 which is mounted to rotate freely upon the hub 234 (Fig. 40) of a cam fixed upon the main shaft 36. The gear 232 is driven by a pinion 236 (Fig. 2) which is fastened to one end of a shaft 238 rotatably mounted in the frame, the other end of the shaft carrying a grooved flywheel 240 (Fig. 1) adapted to be driven by V belts from a motor (not shown).

It is noted here that the crosshead 124, under the control of the cam 130, always positions the shaft 30 at the same height in the machine for any given setting of the cam when the preliminary clamping pressure is applied, and that this pressure is always the same, according to the setting of the pressure relief valve 168 regardless of the aggregate thickness of the shoe parts and the last which are interposed between the jack 10 and the heel plate 18. Because of the uniformity of the size and material of the heel sections and the very slight amount of their compression under the preliminary clamping pressure, the heel seat of the shoe will be at a predetermined distance from the heel plate 18 after the preliminary pressure has been applied. As will be pointed out later, this condition contributes to uniformity in the positioning of the heel seat of the shoe relatively to the heel plate when final clamping pressure has been applied. This matter is of considerable importance from the standpoint of controlling the placement of the leading ends of the fastenings in the shoe. It is further to be understood that the placement of the trailing ends of the fastenings in the shoe is accurately controlled by the fixed relation between the work engaging surface of the heel plate 18, and the ends of the drivers at the end of their driving stroke.

Figure 40:
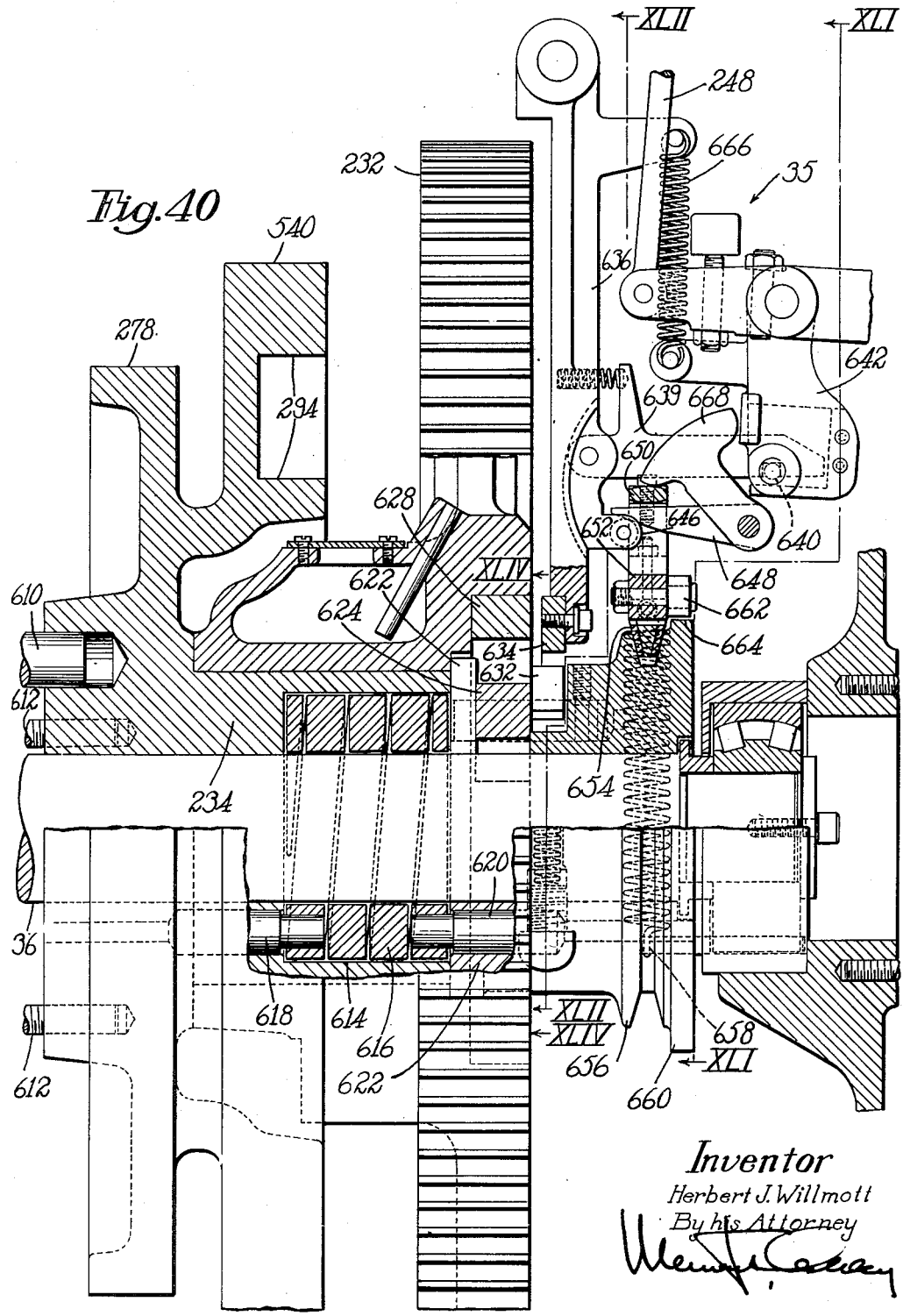
Fig. 40 is a sectional front elevation of the one-revolution clutch mechanism.

After the treadle 22 (Figs. 1 and 2) has been depressed, to put the work under the preliminary pressure, a cycle of operation of the machine may then be started by depressing the hand lever 34, assuming that the machine is otherwise in readiness for being started, as will now be described. The hand lever 34 is fixed to a rock shaft 242 which is rotatably mounted upon the frame and carries near its rear end an L-shaped lever comprising a vertical arm 244 (Figs. 16 and 17), and a substantially horizontal arm 246, the latter arm being connected by a rod 248 to the one-revolution clutch mechanism 35 (Fig. 40). The arm 244 is connected by a link 250 (Figs. 17 and 18) to a shaft 252 which is mounted to slide axially thereof in a bracket 254 which is fixed to the frame. One end of the bracket is provided with a vertical slot 256 arranged to receive the rear end of the above-mentioned arm 148 which has formed therein a hole 258 which, when the treadle 22 is depressed, is in alinement with a reduced terminal portion 260 of the shaft 252. Accordingly, the hand lever 34 cannot be operated to start the machine unless the preliminary clamping pressure has been applied by fully depressing the treadle 22.

A further provision against premature starting of the machine immobilizes the shaft 252, and hence the starting lever 34, if the above-mentioned loader slide 42 has not been completely returned to its retracted position. This safety precaution is provided by a slide 262 mounted for movement in the bracket 254 transversely of the shaft 252, the slide normally being urged rearwardly of the machine by a compression spring 264 (Fig. 19). The slide is provided with a hole 266 arranged freely to receive the shaft 252, when the slide is in one position, and also an elongated slot 268 which freely receives the terminal portion 260 of the shaft, but is too small to admit the larger portion of the shaft. The slide 262 is connected by a link 270 to the lower arm of a lever 272 which is pivoted upon an adjustable eccentric stud 273 carried by the bracket 254. The upper arm of this lever carries a roll 274 which is engaged by a portion of the driving mechanism for the loader slide, and it is to be understood that, when the loader slide is in its fully retracted position, the lever 272, acting through the link 270, holds the slide 262 with its hole 266 in alinement with the shaft 252, whereby the operation of the hand lever 34 is permitted. Conversely, if the loader slide has not been completely returned to its retracted position the slide 262 will have been moved by the spring 264 into such a position that the shaft 252 cannot enter the slide, whereby operation of the hand lever is prevented.

Assuming now that the starting lever 34 has been operated to trip the one-revolution clutch mechanism, three events in the operating cycle of the machine, namely, the application of heavy clamping pressure, the elevation of the jack frame to its pricking position, and the actuation of the string feeding mechanism, take place together. The mechanism for setting up the heavy clamping pressure comprises a cam 278 (Figs. 2, 14 and 15) fixed to the shaft 36, a lever 280 pivoted at 282 on the frame and carrying a roll 284 which runs on the cam, toggle links 286, 288 pivotally connected to a block 290 and the jack frame 20, respectively, and a link 292 which connects the common ends of the toggle links with the above-mentioned lever 280. It will now be observed that the block 290, which is mounted to slide vertically in a recess in the cross head 124, is moved into engagement with the lower side of the thrust bearing 126, when the toggle links are moved toward their extended relation, as illustrated in Fig. 15, and that the shaft 30 and the parts of the jack carried thereby are elevated. The block 290 has a substantially predetermined length of stroke which is sufficient to cause the heaviest clamping pressure which will ever be required to be set up. More or less of this stroke of the block 290 is utilized, depending upon either the desired amount of final clamping pressure or the desired position of the heel seat, by adjusting the above-mentioned cam 130 which determines the initial clearance between the thrust bearing 126 and the block 290 when it is at the bottom of its stroke. Thus, if the cam 130 is adjusted, as illustrated in Fig. 1, with its highest portion cooperating with the roll 128, the thrust bearing 126 will be spaced from the block 290 by a distance substantially equal to the stroke of the block. With this setting of the cam 130 the jack will receive no final clamping movement so no additional clamping pressure will be imparted to the work when the toggle links are moved into their extended relation, and the heel seat will be located at the lowest possible position. Similarly, if the cam 130 is swung counterclockwise, into its other extreme position bringing the lowest portion of the cam against the roll 128, the thrust bearing 126 will be lowered to such a point that there is negligible clearance between it and the block 290 when the latter is at the bottom of its stroke. The maximum available final clamping movement will now be imparted to the jack, and the greatest possible final clamping pressure and the greatest compression will now be imparted to the work when the toggle is extended. Similarly, the heel seat of the shoe will now occupy the highest possible position. It is evident that intermediate amounts of final clamping movement and pressure, compression of the heel, and elevation of the heel seat may be obtained by setting the cam 130 in any desired intermediate position. However, the final clamping movement of the jack is invariable for each setting of the cam 130, and is unaffected by the thickness or resiliency of the work.

It will be observed from the form of the cam 278 (Figs. 14 and 15) that the toggle will be extended during the first 45° of rotation of the cam, and that the togglet will be held in this condition, maintaining the heavy clamping pressure upon the work, throughout the greater portion of the revolution of the cam. During the last 45° of rotation (approximately) of the cam, the toggle is collapsed as indicated in Fig. 14, causing the heavy clamping pressure upon the work to be relieved.

The operation of the above-mentioned wedge 120 for elevating the jack frame 20 takes place concurrently with the setting up of the heavy clamping pressure, and is carried out by the mechanism next to be described. This mechanism includes a cam 294 having a track arranged to receive a roll 296 carried by one arm of a bell crank lever 298 mounted to swing upon a shaft 300 which is fixed to the frame. The other arm of the bell crank lever is bifurcated, and is provided with vertically extending slots 302 along which a pair of blocks 304 may be positioned in any desired location. Another bell crank lever 306, mounted to swing upon a shaft 308 fixed to the frame, has a bifurcated arm provided with elongated slots 310 which receive another pair of blocks 312, these blocks and the above-mentioned blocks 304 being carried by a common shaft 314. The other arm of the bell crank lever 306 is connected by an adjustable eccentric stud 316 to one end of a link 318, the other end of which is pivoted at 320 to the above-mentioned wedge 120 which supports the jack frame. For convenience of manufacture, the link 318 is composed of several parts, two of which are connected by a frangible pin 322 designed to prevent excessive strain from being imparted to any other part of the wedge operating mechanism.

It now will be observed, with reference to Fig. 14, that during approximately the first 45° of rotation of the cam 294, the wedge 120 will be moved, through the connections just decribed, forwardly of the machine into its position as illustrated in Fig. 15. This motion of the wedge is accompanied by a corresponding rising movement of the jack frame 20 which is desired for the purpose of raising the work to such a level with respect to the drivers that the work will be pricked to the required depth during the pricking stroke of the drivers. The depth to which the work is thus pricked is readily controlled by varying the position of the shaft 314 along the slots 302, 310, while the latter slots are in alinement with each other, as illustrated in Fig. 14, before a cycle of operation of the machine is started. The shaft 314 is carried by the lower end of a link 324 which is pivoted to an arm 326 (Fig. 2) mounted to swing upon a shaft 328 carried by the frame. Swivel blocks 330, 332 mounted upon the frame and the arm 326, respectively, are threaded to receive a right and left-hand threaded screw 334 which, when turned by the use of a hand wheel 336 fixed to the upper end of the screw, causes the arm 326 to be raised or lowered as desired, with a corresponding adjustment of the shaft 314. The adjustment of the shaft 314 is always indicated to the operator by a pointer 338 (Figs. 1 and 2) and scale 340, the pointer being carried by an arm 342 which is integral with the arm 326.

As stated above, the application of the final clamping pressure results in predetermined compression of the heel sections, and a corresponding rise in the level of the heel seat of the shoe. The eccentricity of the cam 130, for varying the final clamping movement of the jack and the final clamping pressure, is approximately ½ inch. As there are twelve holes in the plate 136 for receiving the detent 134, the cam 130 may be positioned to vary the effective clamping stroke of the block 290 in increments of $\frac{1}{24}''$. The operator, therefore, knows that the level of the heel seat of the shoe will be changed by approximately $\frac{1}{24}''$ for each increment of adjustment of the cam 130, and, if desired, such change in the level of the heel seat of the shoe can be compensated for by making an appropriate adjustment of the arm 342. Thus, for any length of the final clamping movement of the jack, the operator is enabled accurately to adjust the length of the stroke of the jack frame to insure that the drivers, at the end of their pricking stroke, will have penetrated the work to the desired depth with respect to the heel seat of the shoe.

Within a limited range, the effective length of the pricking stroke of the drivers can be adjusted by the use of the cam 130, and use is made of this adjustment if it is desired slightly to vary the depth to which the work is pricked without varying the stroke of the jack frame. Then too, by varying the extent to which the heel sections are compresssed under the final clamping pressure, a certain amount of control over the relation between the ends of the fastenings and the tread surface of the top lift can be obtained in view of the expansion of the heel sections relatively to the fastenings when the final clamping pressure is relieved.

The final clamping pressure having been applied to the work, the jack frame having been raised to the top of its stroke by the action of the wedge 120, the drivers are operated through their pricking stroke to pierce the work to the proper depth preparatory to the fastening inserting operation, which is carried out during the succeeding driving stroke of the drivers. The construction of the driving mechanism will now be described in detail.

The above-mentioned driver head 38 comprises a block 344 (Fig. 6) in which are mounted a plurality of drivers 346 arranged according to the desired fastening design. To the top of the block there is fixed a plate 348 having a recess in which there is arranged to slide a cam plate 350 having a cam surface 352 near its forward end. Two breast drivers 354 are carried by a block 356 arranged to slide vertically within alined recesses in the block 344 and plate 348. During the pricking stroke the block 356 is in the position illustrated in Fig. 6, the ends of the breast drivers 354 being somewhat above the ends of the other drivers, as required by the transversely arched shape of the heel seat along the heel breast line. However, in advance of the driving stroke the cam plate 350 is moved forwardly by a shoe 358 (Fig. 3), causing the cam surface 352 on the plate to force the block 356 downwardly, bringing the ends of the breast drivers to the same level as that of the other drivers. At this time, the upper surface of the block 356 bears against the bottom surface of the cam plate 350, whereby the drivers 354 are firmly supported. Following the driving return stroke of the drivers, the shoe 358 is retracted from the cam plate, and the latter is moved rearwardly of the machine to permit the breast drivers to rise to their upper position for the succeeding pricking operation. The cam plate is thus operated by a pair of springs 360 which are compressed between a pair of pins 362 mounted in the plate 348, and another pair of pins 364 which project upwardly from the cam plate 350.

The machine is provided with three driver heads which are identical except for the arrangement of the drivers, one being for small shoes, the second for medium size shoes, and the third for large shoes. The selected driver head is mounted in a bracket 366 which is fixed to a cross head 368. Interposed between the base of the bracket 366 and the driver head is a backing plate 370 having at its forward end a lip 372 with which a key 374, rotatably mounted in the cross head, cooperates to hold the backing plate assembled in the machine.

The cross head 368 is fixed to the upper ends of a pair of side rods 376 (Figs. 1, 2 and 27) which are mounted to slide vertically within the above-mentioned bushings 114, and carry at their lower ends another cross head 378. A pair of toggle links 380, 382, at each side of the machine, are hinged on the cross head and the frame of the machine, respectively, each pair of links being pivoted at 384 to a link 386. Each link 386 is pivoted to a vertical arm 388 of a bell crank lever, pivoted at 390 upon the frame, and having a pair of arms 392 on the ends of which cam rolls 394 are mounted. Each pair of these rolls run upon a pair of conjugate cams 396 which are so shaped as to cause the toggle links 380, 382 to be positively moved into both their extended and collapsed positions. These cams are also designed to impart to the driver two strokes of the same length for each complete revolution of the cams. Springs 398, compressed between the upper ends of the lower bushings 114 and collars 400 fixed to the side rods 376, counterbalance the vertically reciprocating parts of the inserting mechanism, and insure the return of the driver head to its uppermost position at the end of each upward stroke, if play should develop in the operating mechanism.

When the machine is in proper adjustment, the lower ends of the drivers 346, at the end of their driving stroke, are at the level of the work engaging side of the heel plate 18, assuming that the heel plate referred to is the thicker type of plate which is used for flush driving. The stroke of the drivers is predetermined and depends, both as to its length and heightwise position in the machine, upon the construction of the driving mechanism. However, the desired relation between the drivers and the heel plate is secured by adjusting the jack frame heightwise by means of the wedge 120. That is, when the machine is set up, and the connections for operating the wedge have been assembled so as to position the lower surface of the heel plate 18 substantially flush with the ends of the drivers when they are at the end of their driving stroke, a further and precise adjustment of the wedge can be made, if necessary, by adjusting the eccentric stud 316 (Fig. 14) which connects the link 318 with the bell crank lever 306.

The spring feeding device 40 comprises upper and lower pawl blocks 402, 404 (Fig. 28) the latter being fixed to the base of a frame 406 from which there extends upwardly a pair of posts 408, these posts being connected at their upper ends by a cap 410. Through the cap and a switch box 412 fixed to the lower side of the cap there extends a vertically reciprocating plunger 414 carrying the pawl block 402 upon its lower end. The plunger is pivoted to a lever 416 which is fulcrumed upon a link 418 pivotally mounted upon the cap 410. The outer arm of the lever 416 is provided with a slot 420 arranged to receive a stud 422 adapted to be fixed in any desired position in the slot, and to provide a pivotal mounting for a link 424. The lower end of this link is notched to receive a stud 426, the latter being mounted in a bracket 428 which is fastened to the top of the jack frame 20. The link 424 is normally held against the stud 426 by a spring 430 stretched between the stud and an arm 432 extending from the upper end of the link. In order to permit operation of the machine, for test purposes, without operating the string feeding device, the link 424 may be disconnected from the stud 426, and then held out of engagement with it by a spring-pressed latch 434 pivoted on the frame of the machine.

The pawl blocks 402, 404 are alike in construction. Each has a pair of lateral pins 436 (Figs. 29 and 30) carrying a series of pawls 438 the inner ends of which are toothed, and are arranged to engage fastening strings which extend through passages 440 in the blocks. Each pawl is swung into gripping engagement with a fastening string by a spring 442. A pair of pawls 444 is similarly mounted upon a stud 448 at the rear of each block, and another pair of pawls 450, which act upon the fastening strings from which fastenings are supplied to the breast drivers, is mounted upon separate studs 452 at the front of each block.

As is well understood in this art, downward movement of the pawl block 402 causes the fastening strings to be carried down with the block, through the same distance, to feed a sufficient length of the fastening strings for a set of fastenings to be cut therefrom. Upon the return stroke of the pawl block 402, the pawls of this block release their grip upon the fastening strings, and the pawls of the lower pawl block 404 prevent back feeding of the strings at this time. This feeding movement of the upper pawl block 402 is derived from the above-mentioned jack frame 20, and occurs when the jack frame is raised to its pricking position. Thus, when the jack frame 20 is raised, carrying with it the link 424 (Fig. 28), the lever 416 is rocked clockwise, lowering the plunger 414 and hence the pawl block 402. The amount of such movement of the pawl block 402 may be made equal to the rising movement of the jack frame, or proportionately greater or less than the movement of the jack frame, by making an appropriate adjustment of the stud 422 lengthwise of the slot 420. It is evident that if the arms of the lever 416 have the same length, the feeding movement of the strings will be equal to the depth to which the work is pricked by the drivers; and that if, as is sometimes the case, it is desired to employ fastenings somewhat longer than the depth to which the work has been pricked, this result can readily be obtained by so adjusting the stud 422 as to cause the outer arm of the lever 416 to be somewhat shorter than the inner one.

It has been pointed out above that the ends of the breast drivers 354 are at a level above that of the ends of the other drivers 346 during their pricking stroke, and hence do not prick the work as deeply as do the other drivers. It is now apparent that the two central breast fastenings should be shorter than the remaining fastenings, and that the fastening strings from which fastenings are supplied to the breast drivers be fed a correspondingly shorter distance than the other strings are fed. To this end, a cam 453 (Fig. 16) is mounted by means of a bolt 454 for vertical adjustment upon the cap 410 so as to hold the breast pawls 450, (Fig. 29) on the upper pawl block 402, out of engagement with the fastening strings, and thus delay the gripping action of these pawls until the pawl block has gone through that part of its downward stroke which is equal to the difference in length between the breast fastenings and the remaining fastenings.

The fastening strings are guided into the switch box 412 through a series of guide tubes 455 (Figs. 2 and 28) which are fixed to the cap 410. A rack 456, fixed to the rear of the machine frame, is arranged to hold a plurality of reels 458 of fastenings strings, which are directed toward the above-mentioned guide tubes 455 by another set of guide tubes 460 which are fixed to the rack. When any of the reels becomes exhausted, and the trailing end of this string passes through the switch box 412, a circuit is made in the latter which causes a tell-tale lamp 461 (Fig. 1), in a control box 462 at the front of the machine, to be lighted.

At the same time, a rod 463 which extends downwardly out of the control box is locked against downward movement by mechanism to be described later. This rod is pivoted to an arm 464 (Fig. 16) which is fixed upon the rock shaft 242 and, accordingly, when the rod 463 is locked the hand lever 34 cannot be operated to start the machine. As will be described later, the controls for the machine permit it to complete any cycle of operation during which the exhaustion of a fastening string takes place; but the exhausted reel of fastening material must be replenished, and the string threaded through the string feeding device before the machine can be operated again.

The switch box 412 comprises upper and lower plates 465, 466 (Figs. 28 and 32) of insulation, having a pair of alined bushings 468, 468 for each fastening string. In the upper plate 465 there is mounted a conductor 470 (Fig. 32) having therein a series of contacts 472, one for each of the fastening strings. Pivoted within notches 474 in the lower plate 466 is a series of elbows 476, each having a passage arranged to receive a fastening string, and a pair of trunnions 478 upon which it swings. Each elbow carries a contact 480 which is connected by a spring 482, under light compression, to a conductor 484, the conductors 470, 484 being connected by leads 471, 471a (Fig. 45), respectively, with the lamp 461 and a source of power. It will now be evident that in the event that the trailing end of a fastening string passes out of an elbow, the contact 480 will be swung into engagement with the contact 472, thereby closing the circuit to the lamp 461, and locking the rod 463 as will be described later, so that another cycle of operation of the machine cannot be started until the exhausted fastening string is replenished.

The fastening strings upon leaving the lower pawl block 404 enter alined passages 485 (Figs. 28, 33, 34 and 35) in the frame 486, and in a support 486 which is secured, over a shear plate 488, to slideways 490, the latter being adjustably fixed to the machine frame. The above-mentioned loader slide 42 is provided with a rib at each side which runs in a groove 492 in each slideway, for guiding the slide in its movement between its loading position (Fig. 33), and its delivery position in register with the drivers, as illustrated in Fig. 34. The loader slide is provided with multiple sets of passages 493, one set for each of the three fastening designs available in the machine, so that one loader slide will suffice for all uses of the machine. It is necessary, however, that the fastening strings be directed from the single set of passages 485 into that set of passages in the loader slide which corresponds to the driver head being used. This result is obtained by the use of a transfer assembly for each fastening design, each assembly comprising a shear plate 488, a transfer plate 496 and a transfer block 498. Splayed passages 500 in the transfer block 498 direct the strings from the passages 485 into a series of alined passages 502 in the rear portion of the transfer plate 496 and the shear plate, these latter passages being arranged according to the fastening design of the driver head being used. A similar set of alined passages 504 is provided in the forward portions of the transfer plate and shear plate, these passages being arranged to receive the drivers 346, 354 and to guide them at all times. That is, even when the drivers are at the top of their stroke their lower ends lie within the transfer plate 496 as illustrated in Fig. 33. It is for this reason, and in order to permit the interchange of the different machine parts according to the desired fastening design, that the driver block 344 is backed up by the removable backing plate 370. Not until the plate is removed from the bracket 366, is it possible to lift the drivers out of their holder 496. At such time also, one transfer assembly can be interchanged for another without interference from the drivers. The transfer block 498 is secured to the transfer plate 496 by rivets 506; and a dowel 508, fixed to the frame 406 and arranged to enter aligned openings 509 in the support 486 and guide block 498, locks these parts together when the string feeding device is lowered into its operative position.

A cutter plate 510, which cooperates with the shear plate 488 to sever individual fastenings from the strings, is secured by a bolt 512 to the loader slide 42, this cutter plate having passages 514 alined with the passages 493 in the loader slide for receiving the fastenings, and directing them into the similar passages 74 in the pressure block 68. As has been stated above, the loader slide is moved from its loading position (Fig. 33) into its delivery position, in register with the drivers, (Fig. 34) after the jack frame drops to its driving position, and just before the drivers start their driving stroke. It is now evident that, at the beginning of this movement of the loader slide, the portions of the strings below the shear plate 488 are cut from the strings, as individual fastenings, by the shearing action between the cutter plate 510 and the shear plate 488.

In order to minimize the load upon the driving mechanism for the loader slide when the cutting of the fastening strings takes place, the shear plate 488 and cutter plate 510 are so constructed and arranged that the cutting action on the fastening strings is begun at different times, that is, in staggered relation. This result is obtained by forming cutting edges 516 (Fig. 36) on the cutter plate 510 in an arrangement which is slightly different from that of the cooperating cutting edges at the lower ends of the passages 502 in the shear plate 488. In the illustrated machine, these cutting edges 516 are formed by making counterbores 518 of different diameters in the plate 510, and hence, the fastening associated with the smaller counterbore receives the cutting action first. Similarly, the string associated with the largest counterbore receives the cutting action last, and is the last string to be completely severed. The offset relation between the passages 514 in the cutter plate 510 and the cutting edges 516 also causes the upper ends of the fastenings, upon being severed from the strings, to be upset or deformed slightly laterally thereof, because the upper end of each fastening is bent slightly about the shoulder at the base of each counterbore. Accordingly, when the severance of the fastenings has been completed, their upset upper ends become lodged against the shoulders at the bottoms of the counterbores, whereby the fastenings are prevented from dropping out of the loader block. For economy of manufacture, the cutter plate 510 is counterbored at both sides, so that a fresh set of cutting edges may be obtained by inverting the cutter plate after the first set has become dulled.

A key 520 (Fig. 34) riveted upon the transfer plate 496 and received in a slot 522 in the shear plate 488 insures the lateral alinement of these members. To facilitate assembling these members in the machine, the key passes freely through another slot 524 formed in the upper edge of the pressure block 68. In addition, the key 520 cooperates with a slot 526 in the cutter plate 510 in order to insure the lateral alinement of the forward end of the loader slide with the drivers when the slide is moved into its delivering position. For limiting the stroke of the loader slide at each end thereof, the slide is provided with a key 528 which cooperates with the rear end of the shear plate and a shoulder 530 at the rear end of a recess formed in the slideway 490.

The driving mechanism for the loader slide includes an extensible link 532 (Figs. 2 and 16) having a shoulder 534 at its forward end which is arranged to engage the roll 274 upon the above-mentioned lever 272 of the mechanism for preventing the machine from being started unless the loader slide has been fully returned to its loading position. At its rear end, this link is connected to a lever 536 which is pivoted upon the frame by means of the above-mentioned shaft 328 and carries at its lower end a cam roll 538. This roll runs upon a cam 540 which is fixed to the shaft 36, the cam being so shaped as to swing the lever 536 in a counterclockwise direction, and hence to move the loader slide into its delivery position, in register with the drivers, just prior to the driving stroke of the drivers.

The loader slide is positively moved into and is held in its delivery position by the above-mentioned connections, including the extensible link 532, which are operated by the cam 540, it being understood that when the roll 538 bears on the "high" portion of the cam the link 532 is adjusted to such a length that the key 528 just engages the rear end of the shear plate 488. The loader slide remains in this position throughout the driving stroke of the drivers, and later is moved to its loading position when the roll 538 runs off the high segment of the cam 540. This rearward movement of the loader slide is terminated by the engagement of the key 528 with the shoulder 530, whereby the alinement of the string receiving passages in the loader slide and shear plate is insured. The loader slide is returned to and is held in its loading position by the action of an extensible link 542 containing a spring under compression. The lower end of this link is pivoted to the lever 536 above the roll 538, and its upper end is pivotally mounted upon the frame. In order to insure that the loader slide may fully return to its loading position, as determined by the engagement of the key 528 with the shoulder 530, the portion of the cam 540 which moves past the roll 538, after the key 528 strikes the shoulder 530, is relieved to provide a slight clearance between the roll and the cam. The movement of the loader slide into its delivery position is cushioned by suction within a dash pot 544 having a plunger 546 which is pivoted on the lever 536. The dash pot is also so constructed and arranged as to cushion, by compression, the return movement of the loader slide into its loading position.

Reference has been made above to the shoe 358, which operates the cam plate 350 to lower the breast drivers 354 to the level of the other drivers in advance of their driving stroke. The mounting of and operating mechanism for this shoe will now be described. The shoe is carried by a cross bar 548 (Figs. 2, 16 and 33) the opposite ends of which are fixed to a pair of side rods 550 mounted to slide horizontally in the frame 406. These rods are connected at their rear ends by a yoke 552 carrying a roll 554 which is engaged by a lever 556 pivotally mounted upon the slideway 490. A spring 558 (Fig. 33) compressed between the frame 406 and the yoke 552 normally urges the latter rearwardly, to hold the roll 554 in engagement with the lever 556. A roll 560 (Fig. 16) mounted upon the upper end of the lever 536 cooperates with a curved track 562 in the lever 556 to cause the latter to be swung counterclockwise, when the loader slide is moved into its delivery position, whereby the shoe 358 is advanced, and the cam plate 350 is moved into its operative position to lower the breast drivers 354. When permitted by the lever 556, the shoe 358 is returned to its rearward position by the spring 558.

In order to permit the withdrawal of the transfer assembly for the purpose of interchanging it for another of a different fastening design, or for servicing this part of the machine, it is necessary that the fastening strings be retracted out of the transfer assembly. This is accomplished, in the illustrated machine, by lifting the string feeding device 40 bodily with respect to the support 486 by the use of a lever 564 (Figs. 1, 2 and 16) which projects from the front of the machine. In order to permit such operation of the feeding device the posts 498 (Fig. 28) of its frame are bored freely to receive a pair of vertical rods 566 which are fixed in the support 486. The lever 564 is mounted to swing vertically upon a rod 568 carried by the slideway 490, and is connected by a U-shaped bar 570 with another lever 572 (Figs. 33 and 37) which is also mounted upon the rod 568. These levers are connected by a pair of links 574 to the posts 498. The weight of the string feeding device is partially counterbalanced by a pair of springs 576 which are stretched between the frame and a pair of arms 578 effectually integral with the levers 564 and 572.

The string feeding device is locked in its operative position by a latch 579 which is mounted yieldingly to swing upon the support 486, at its left-hand side, against a pin 580 which projects from the frame 406. When the string feeding device is raised the pin moves upwardly within a slot in the latch, and upon becoming seated in a horizontal notch at the upper end of the latch, the latch and pin cooperate releasably to hold the feeding device in its retracted position.

Various provisions are made in the machine for preventing its operation if its interchangeable parts are not properly matched, or if certain parts of the machine have not been brought into their proper operative positions. A door 581 (Fig. 1), hinged upon the front of the machine frame, upon being closed, closes a switch 582 (Fig. 45) in the control box 462 for controlling a supply of power to the driving motor for the machine, and until the door is closed, the machine cannot be started. If no transfer assembly has been installed in the machine a spring-pressed key 584 (Figs. 33 and 34), mounted to slide forwardly and rearwardly of the slide-way 490, moves beneath the forward flange of the cross bar 570 so as to interfere with the cross bar, if it is attempted to lower the lever 564 and hence the fastening-string feeding device 40. If this lever is not completely lowered it prevents the closing of the door 581 which, however, is provided with a notch 586 arranged freely to receive the lever if it has been fully lowered. As illustrated in Figs. 33 and 34, the key 584 is normally held out of the path of the cross bar 570 by engagement with the plate 496 of a transfer assembly which is properly installed in the machine.

The key 374 (Figs. 1 and 3), for holding the backing plate 370 in the bracket 366, is also arranged to interfere with shoulders at each side of a slot 588 on the door, to prevent its closing, unless the key has been set vertically within a groove 590 in the lip 372. Similarly the latch 72, for locking the heel plate 18 in the pressure block 68, is arranged to interfere with another shoulder 592 on the door unless the latch has been moved to its inclined closed position (Fig. 1), and such movement of the latch is impossible unless the heel plate has been fully inserted into the pressure block.

It is already evident that the driver head and the transfer assembly must be matched before the driver head can be properly assembled in the bracket 366. That is, the drivers and the passages 504 must be of the same fastening design. Provision is also made to insure against mismatching of the heel plate and the transfer assembly, and it is evident that when these parts are matched the matching of the drivers and the heel plate is also insured.

Referring now to Fig. 8 it will be observed that the heel plate 18 is provided at its rearward edge with a notch 594. Each heel plate has such a notch which cooperates with an indexing mechanism for permitting the use of only that heel plate which matches the transfer assembly already installed in the machine. The plate 496 of that transfer assembly having the largest fastening design (Figs. 11 and 37) has an arm 596 riveted thereto, and positioned by this arm and the opposite side of the shear plate 488 are a pair of levers 598 which are pivoted upon the rear end of the pressure block 68, the lower end of each of these levers being joined by pin and slot connections to a link 600. This link is mounted to slide horizontally on a stud 602 (Figs. 12 and 13) which is threaded into the pressure block and passes through an elongated slot in the link. A key 604 projecting downwardly from the link is arranged to be received in the above-mentioned notch 594 of that heel plate 18 which matches the transfer assembly carrying the arm 596. This heel plate, but no other, is thus permitted to be assembled in the pressure block. Another transfer assembly (Figs. 12 and 38), for the smallest fastening design, has at its left-hand side an arm 606 which cooperates with one of the levers 598, the other lever cooperating with the right hand side of the shear plate 488, to position the key 604 at the right-hand extremity of its movement. The third transfer assembly, for the intermediate fastening design, has an arm 608 (Figs. 13 and 39) at each side thereof, these arms cooperating with the levers 598 to cause the key 604 to be located in its mid position, corresponding to the position of the notch 594 in the heel plate which matches this transfer assembly. It will now be evident that if it is attempted to install any heel plate 18 which does not match the transfer assembly already in the machine, that heel plate cannot be fully inserted into the pressure block because of the interference of the key 604. Accordingly, the latch 72 cannot be moved to its closed position, and the door 581 cannot be closed nor can the machine be started.

Assuming that properly matched parts of the machine have been installed therein, that the door is closed, that a complete set of fastening strings have been inserted into the string feeding device, that the treadle 22 has been depressed to cause preliminary clamping pressure to be applied to a shoe on the jack, and that the loader slide has been fully retracted to its loading position, the starting lever 34 may be depressed to initiate a complete cycle of operation of the machine at the end of which it comes to rest automatically.

The one-revolution clutch mechanism 35 (Fig. 40), which is actuated by depressing the lever 34, will now be described in detail. For convenience of manufacture the cams 278, 294 and 540 are made from the same blank which includes the above-mentioned hub 234. This cam unit is connected by dowels 610 and screws 612 to the hub of the conjugate cams 396, the latter cams also being made from a single blank.

Fitting closely within a counterbore 614 in the hub 234 is a helical spring 616 which, near its inner end, is attached to the hub by a pin 618. Another pin 620 secures the other end of this spring to a collar 622 having a running fit upon the shaft 36. Upon the collar there is pivoted a dog 624 (Figs. 42, 43 and 44) the extreme outer end of which is adapted to engage any one of a series of shoulders 626 formed in a ring 628 which is fixed to the gear 232. The dog is constantly urged toward the ring by a spring-pressed plunger 630 which engages a projection 632 extending outwardly from the dog 624; but an arcuate shoe 634 (Fig. 42) acting upon the projection normally holds the dog away from the ring 628. This shoe is fixed to the lower end of an arm 636 which is mounted to swing laterally off the end of the projection 632, when a cycle of operation of the machine is started, permitting the dog to become engaged with a shoulder 626, and driving engagement to be established between the gear 232 and the collar 622. The spring 616 is now "unwound" a small amount, yieldingly to initiate rotation of the cam-hub 234. This resilient driving action of the spring 616 is insufficient to transmit all the driving force which the cams require, and the spring soon is expanded radially into gripping engagement with the counterbore 614, effecting a frictional but substantially positive drive.

The driving pressure between the dog 624 and the ring 628 depends upon whether the cams are doing work upon the mechanism which they drive. That is, at certain times, when a falling slope on one of the cams is presented to its follower roll, the pressure of the latter upon the cam may cause the driving pressure between the dog and the ring to be relieved altogether, and the collar 622 to be accelerated with respect to the ring 628. Were such overdrive of the collar to occur, the dog 624 would reengage the shoulder 626 with a pounding action detrimental to the mechanism whenever their normal driving relation is reinstated. Such pounding action is prevented by a hook 637 on the dog which is arranged to overlap a similar hook 638, one of which is formed on the ring 628 opposite to each of the shoulders 626. The clearance between the hooks 637, 638 is sufficient only to permit the dog to swing into engagement with a shoulder 626, such clearance being so small as to prevent any material separation between the shoulder and dog whenever there is any tendency for the collar 622 to turn faster than the ring 628 in the same direction.

The arm 636 is operated by connections comprising a latch 639 pivoted at one end to the arm, and having at its other end a notch arranged to receive a pin 640 mounted in the lower arm of a bell crank lever 642. The other arm of this lever is connected to the above-mentioned rod 248 which is lowered whenever the hand lever 34 is depressed. Through these connections the arm 636 is swung outwardly, to release the dog 624, in response to downward movement of the rod 248, and such movement of the arm causes a roll 646, mounted upon the lower end of the arm, to lift a lever 648 which engages the lower side of a bar 650. This bar is fixed to a swinging brake arm 652 (Fig. 41) having a shoe 654 which engages a brake drum 656 fixed to the shaft 36. Normally, the brake shoe is held against the drum by a spring 658 which is attached to the outer end of the arm 652. However, after a revolution of the cams has been started, as above described, the brake shoe is held out of engagement with the brake drum, through the greater part of the revolution of the cams, by a cam surface 660 on the drum which engages a roll 662 mounted upon the arm 652. A depression 664 in the cam surface is arranged to receive the roll with some clearance near the end of a complete revolution, whereby the reengagement of the brake shoe 654 with the drum 656 is permitted at that time.

Shortly after the shoe 634 is moved out of engagement with the projection 632, the upper side of the bar 650 engages the latch 639, lifting its notched end off the shaft 640 and, accordingly, the arm 636, under the influence of springs 666 stretched between the arm 636 and the bell crank 642, returns to its operative position in readiness to reengage the projection 632 at the end of a revolution of the shaft 36. The arm 636 can be actuated only once for each cycle because the lever 642 is prevented from following the latch 639 when the latter is released from the pin 640. The lever 642 is thus controlled by an arm 668 which at one side is supported by the bar 650, and at its other side engages the lower arm of the lever 642. When, at the end of a revolution of the shaft 36, the brake shoe 654 reengages the drum 656, the arm 668 is lowered, permitting the lever 642 to swing under the influence of the springs 666 into its original position, whereupon the latch 639 becomes reengaged with the pin 640.

The electrical controls for the machine will now be described. The above-mentioned control box 462 (Fig. 1) houses, or has mounted thereon, electrical equipment comprising the above-mentioned tell-tale lamp 461, and the switch 582 having a contactor 670 (Fig. 45) which is moved into its closed position when the door 581 of the machine is closed. Other equipment in the control box comprises a switch having a contactor 672 which normally is held closed, when the cover for the control box is closed, but automatically moves to its open position if the cover is removed; a solenoid operated switch 674 having contactors 676, 678, 680 and connected by the leads 471, 471a to the above-mentioned switch box 412 of the fastening string feeding device; a starting and stopping switch 682 having push-button operated starting and stopping contactors 684, 686, respectively; a normally open switch having a contactor 688 which is operated by the above-mentioned rod 463, and is moved to its closed position when the rod is lowered in response to the operation of the starting lever 34; and a latch 690 mounted to swing upon a stud 692 fixed to the control box, and arranged normally to lie within a notch in the rod 463, in order to lock the rod and hence the starting lever 34 in their upper position against downward movement. The disengagement of the latch 690 from the rod 463 is effected, as will be described later, by a solenoid 694 which is connected to the latch by a link 696.

Figures 27, 45:
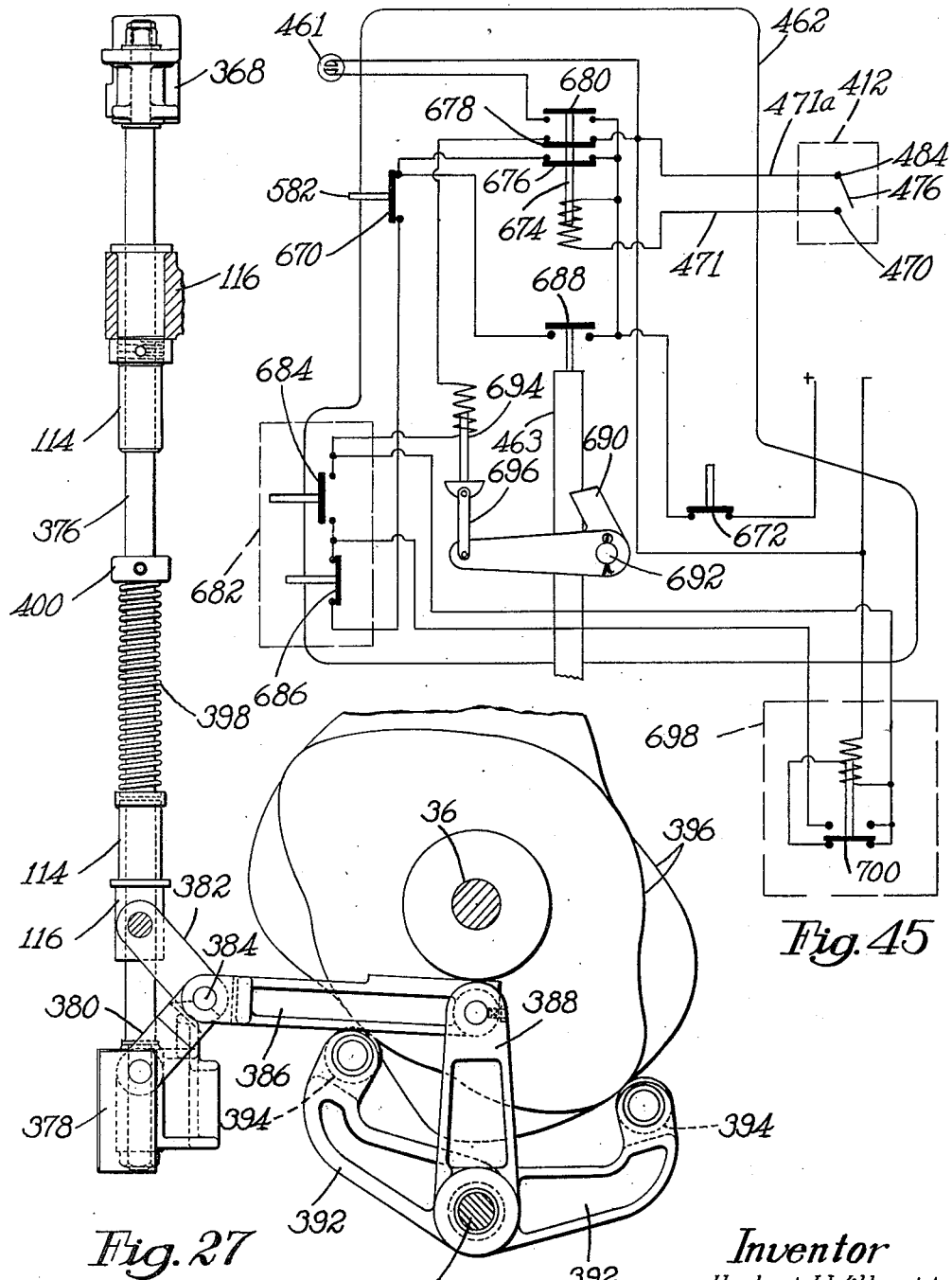
Fig. 27 is a side elevation of the operating means for the fastening inserting mechanism.
Fig. 45 is a diagrammatical view of the electrical equipment for controlling the operation of the machine.

Outside of the control box 462, but forming an important part of the electrical equipment, is a solenoid operated relay 698 having a contactor 700 which normally is in the position in which it is illustrated in Fig. 45 but which, when it is raised, closes a switch for starting the driving motor for the machine (through mechanical connections not shown).

Assuming now that the machine is in readiness for operation, the operator depresses the starting button of the switch 682. By so doing, the contactor 684 completes circuits which supply power to the solenoid 694 and the relay 698. The relay 698 now being energized, its contactor 700 moves to its upper position, simultaneously completes a holding circuit for itself and for the solenoid 694, and causes the driving motor to be started. The solenoid 694 also now being energized, the latch 690 is disengaged from the bar 463, whereby the starting of the machine through a complete cycle of its operation is permitted. The driving motor can be stopped at any time by depressing the stop button which causes the contactor 686 to cut off the supply of power to the relay 698, whereby its solenoid is de-energized and the contactor 700 returns to its lower position as illustrated in Fig. 45.

If any of the fastening strings runs out of the switch box 412, permitting one of the switches 476 therein to close, the solenoid operated switch 674 is energized, causing the contactor 680 to close a circuit to the lamp 461, and the contactors 676 and 678 to open circuits for supplying power to the relay 698 and solenoid 694, respectively. The relay 698 is not deenergized (nor is the driving motor stopped) at this time, however, because a circuit in parallel with that including the contactor 676, is still closed by the contactor 688. Accordingly, even though the exhaustion of a reel of fastening string material takes place, the machine is not stopped until the rod 463 and contactor 688 rise at the completion of that cycle of operation of the machine during which the exhaustion of the fastening material takes place. That is, the action of the clutch mechanism 35 when it terminates a cycle of operation of the machine, lifts the rod 463 through the above-described connections including the clutch rod 248, causing the contactor 688 to be moved to its open position. The supply of power to the starting button is now cut off until a new length of fastening material has been supplied to the string feeding device, and until that switch 476 which formerly was closed is opened again, when the solenoid-operated switch 674, now deenergized, returns to its normal position, as illustrated in Fig. 45.

The use and operation of the machine will now be briefly summarized. After a lasted shoe has been placed on the jack 10 and heel sections have been inserted between the arms 76, 78 of the heel holder, the jack is moved rearwardly to bring the heel seat of the shoe directly underneath the heel sections. Preliminary clamping pressure is now applied to the work by depressing the treadle 22. Upon seeing that the shoe parts are in the proper relation, the operator next depresses the starting lever 34 which causes the clutch mechanism 35 to drive the machine through one complete cycle of operation, at the end of which the machine automatically comes to rest.

Taking place simultaneously are the application of the final clamping pressure caused by the movement of the toggle links 286, 288 into their extended relation, the bodily lifting of the jack frame 20 in response to the forward sliding movement of the wedge 120, and the lowering of the string feeding device 40 through the mechanism connecting it with the jack frame. During this downward stroke of the string feeding device, lengths of fastening strings are fed into the passages 493 of the loader slide 42, which is now in its rearward loading position.

The driver head 38 next moves downward through its pricking stroke, the drivers 345, 354 pricking the work to the desired depth, as determined by the upward movement of the jack frame. As soon as the pricking return stroke of the driver head is completed, the jack frame and the string feeding device are returned to their original positions.

While the driver head is at rest at the top of its stroke, the loader slide 42 is next moved forwardly into its delivery position, causing the lengths of the fastening strings which were previously fed into the passages 493 to be formed into separate fastenings, and to be brought into register with the drivers. At this point, the driver head goes through its driving stroke, causing the fastenings to be forced out of the loader slide, through the pressure block 66, and heel plate 18 and to be driven into the shoe parts. As has been more fully pointed out above, the ends of the drivers at the end of their driving stroke and the lower surface of the heel plate 18 are at substantially the same level when the type of heel plate suitable for "flush" driving is used; but for "blind" driving, a thinner heel plate will be used which causes the work to be supported a short distance within the stroke of the drivers.

On the completion of the driving return stroke, the loader slide 42 is returned to its loading position and the clamping pressure on the work is relieved. The final clamping pressure is relieved as a result of the movement of the toggle links 286, 288 into their collapsed positions, and the preliminary pressure is relieved upon the release of the arm 148 by the terminal portion 260 of the shaft 252, which is automatically retracted by the connections between it and the clutch mechanism 35 at the end of the cycle of operation of the machine.

Having thus described my invention, what I claim as new and desire to secure by Letters Patent of the United States is:

1. In a fastening machine, work supporting mechanism comprising a heel plate and a jack movable to force the work against the heel plate, fluid-operated means acting upon said jack for applying a predetermined preliminary pressure to force the work against said heel plate, and means for moving said jack an invariable additional distance toward said heel plate to apply a heavy final clamping pressure to the work unaffected by the thickness of the work.

2. In a fastening inserting machine, a jack frame carrying a heel plate, a jack movable upon said frame to hold the work against said heel plate, an operating member for moving said jack toward and away from said heel plate, means carried by said jack frame for supporting said operating member at different positions in said jack frame, power operated means acting upon said operating member to cause said jack to apply predetermined preliminary clamping pressure to the work, and a second power operated means supported by said jack frame constructed and arranged bodily to move said operating member and said jack a predetermined amount toward said heel plate thereby to apply a predetermined final clamping pressure to the work.

3. In a fastening inserting machine, a jack frame having a heel plate for supporting the work, a jack movable toward said heel plate to apply clamping pressure to the work, an operating member for moving said jack toward and away from said heel plate, fluid-operated mechanism acting upon said operating member to cause the jack to apply a predetermined preliminary clamping pressure to the work, means carried by said jack frame for supporting said operating member when the work is under the preliminary clamping pressure, and power operated means for moving said operating member and jack toward said heel plate to cause a heavier final clamping pressure to be imparted to the work, said power operated means comprising a toggle mechanism supported by said jack frame and movable into engagement with said operating member.

4. In a fastening inserting machine, a jack frame carrying a heel plate, a jack movable upon said jack frame to hold the work against the heel plate, means for supporting said jack comprising an operating member, a cross-head mounted to slide upon said jack frame and a cam carried by said jack frame, said cam being adjustable to vary the position of said cross-head upon said jack frame, fluid-operated means acting upon said operating member to cause said jack to apply a preliminary clamping pressure to the work, and means for applying an additional heavier clamping pressure to the work comprising a toggle mechanism supported by said jack frame and constructed and arranged bodily to move said operating member and jack toward said heel plate.

5. In a fastening inserting machine, work supporting mechanism comprising a jack frame having a heel plate, a jack mounted for movement upon said jack frame to hold the work against said heel plate, a rotatable and axially movable member for moving said jack toward and away from said heel plate, fluid-operated means for rotating said member whereby said jack is caused to impart a predetermined preliminary clamping pressure to the work, and power operated means for imparting a predetermined axial movement to said member whereby a heavier final clamping pressure is imparted to the work.

6. In a fastening inserting machine, work supporting mechanism comprising a jack frame having a heel plate fixed therein, a jack movable on said frame toward and away from said heel plate, fluid-operated means comprising a screw acting upon said jack to apply a preliminary clamping pressure, means for applying an increased final clamping pressure to said screw comprising a pressure block movable through a predetermined stroke into engagement with said screw, and means carried by said jack frame for adjustably supporting said screw at different levels within the stroke of said pressure block whereby the effective stroke of the block and the final clamping pressure are varied.

7. In a fastening inserting machine, work supporting mechanism comprising a jack frame having a heel plate, a jack mounted for movement upon said jack frame to hold the work against said heel plate, a rotatable and axially movable member for moving said jack toward and away from said heel plate, fluid-operated means for rotating said member whereby said jack is caused to impart a predetermined preliminary clamping pressure to the work, power operated means for imparting a predetermined axial movement to said member whereby a heavier final clamping pressure is imparted to the work, said power operated means comprising a plunger movable through a predetermined stroke, and means for supporting said member at different positions within the stroke of said plunger whereby the final clamping pressure may be varied.

8. In a fastening inserting machine, work supporting mechanism comprising a jack frame having a heel plate for supporting the work and a jack movable on said frame toward said heel plate to apply clamping pressure to the work, means for supporting said jack comprising a cross-head mounted to slide upon said jack frame, a pressure block mounted to slide upon said cross-head, means carried by said jack frame for supporting said cross-head in different positions upon said jack frame, fluid-operated means for applying preliminary clamping pressure to the work, said means including a screw supported by said cross-head within the stroke of said pressure block, extensible connections between said pressure block and said jack frame for bodily moving said screw and jack toward said heel plate to cause a heavier final clamping pressure to be imparted to the work, and power operated means for operating said connections through a predetermined stroke.

9. In a heel attaching machine, fastening inserting mechanism comprising a driver movable through alternate pricking and driving strokes of the same length, a work support comprising an abutment and a jack movable toward said abutment to hold thereagainst a heel section to be applied to a lasted shoe on the jack, and means for positioning said work support at one level with respect to the ends of the driver at the end of its driving stroke, said means being constructed and arranged to move said work support toward said driver in advance of the termination of its pricking stroke whereby said driver is caused to prick the work preparatory to the driving of fastenings therein.

10. In a heel attaching machine, a work support comprising an abutment and a jack movable on said support to hold the work against said abutment, fastening inserting mechanism comprising a driver movable toward and away from said work support through alternate pricking and driving strokes of the same length, said work support being constructed and arranged normally to hold the work engaging surface of said abutment at substantially the level of the end of the driver at the end of its driving stroke, and means for moving said work support toward the driver in advance of the termination of its pricking stroke whereby the driver is caused to prick the work preparatory to the driving of fastenings therein.

11. In a heel attaching machine, fastening inserting mechanism comprising a driver operable through alternate pricking and driving strokes, a work support for clamping together a lasted shoe and a heel section in a predetermined position with respect to the driver, and means for alternately moving said work support from its said predetermined position to bring the work within the path of said driver before the termination of its pricking stroke and returning said support to its said predetermined position before the termination of the driving stroke of said driver.

12. In a fastening inserting machine having a reciprocatory driver movable through alternate pricking and driving strokes, a reciprocatory jack frame upon which a heel plate and a jack are mounted and arranged to hold the work in a predetermined position in said jack frame, and means for supporting said jack frame so as to position the work engaging surface of said heel plate at a predetermined level wtih respect to said driver at the end of its driving stroke, said last-mentioned means being constructed and arranged to move said jack frame toward said driver during the pricking stroke of said driver whereby said driver is caused to prick the work preparatory to the driving of fastenings therein.

13. In a fastening inserting machine, work supporting mechanism comprising a sliding jack frame mounted for movement between a driving position and a pricking position, a support carried by said frame and adapted to be engaged by the work, a jack movable upon said frame to hold the work against said support, fastening inserting mechanism comprising a driver mounted to reciprocate toward and away from said jack frame with a constant stroke, and means for supporting said jack frame so as to bring the work substantially flush with the driver at the end of its driving stroke, said means being operable in advance of the end of the succeeding stroke of said driver to move said jack frame toward the driver whereby the latter is caused to prick the work.

14. In a heel attaching machine, fastening inserting mechanism comprising a driver movable through alternate pricking and driving strokes, a work support comprising a heel plate and a jack cooperating to clamp together a lasted shoe and a heel section in such a position that the end of the driver at the end of its driving stroke is substantially flush with the work engaging surface of the said heel plate, and means for alternately moving said work support toward said driver before the completion of its pricking stroke, and thereafter returning said support to its first-mentioned position.

15. In a fastening inserting machine, fastening inserting mechanism comprising a driver movable through alternate pricking and driving strokes, work supporting mechanism comprising a jack frame carrying a heel plate, a jack mounted for movement upon said jack frame and cooperating with said heel plate to apply clamping pressure to the work, means for alternately moving said jack frame toward and away from said driver before and after the pricking stroke of the driver, respectively, and power-operated means for moving said jack with a predetermined pressure toward said heel plate, said power operated means comprising connections arranged to transmit the thrust of said jack to said jack frame.

16. In a fastening inserting machine, fastening inserting mechanism comprising a driver movable through alternate pricking and driving strokes, work supporting mechanism comprising a jack frame having a heel plate through which said driver operates, and a jack cooperating with the heel plate to apply clamping pressure to the work, power operated means cooperating with said jack to cause a predetermined clamping pressure to be applied to the work, means for moving said jack frame in one direction to bring the work within the pricking stroke of said driver, and in the opposite direction to bring the work engaging surface of said heel plate substantially to the end of the driving stroke of the driver, said power operated means comprising connections between said jack and said jack frame for supporting said jack against the clamping pressure at a constant position in the jack frame throughout its movement toward and away from said driver.

17. In a fastening inserting machine, fastening inserting mechanism comprising a driver movable through alternate pricking and driving strokes, work supporting mechanism comprising a jack frame having a heel plate, a jack mounted for movement upon said jack frame to hold the work against said heel plate, a sliding wedge for supporting said jack frame so as normally to position the work engaging surface of said heel plate at substantially the end of the driving stroke of said driver, fluid-operated means for moving said jack with a predetermined preliminary pressure toward said heel plate, power operated means for imparting an additional predetermined pressure to said jack whereby a heavier final clamping pressure is applied to the work, and power operated means for moving said wedge, before said driver reaches the end of its pricking stroke, to move said jack frame a predetermined distance toward said driver, whereby the work is brought within the pricking stroke of said driver.

18. In a fastening inserting machine having a driver movable through successive pricking and driving strokes, jacking means for supporting the work against the pressure of said driver, a loading member movable into and out of the path of the driver before and after its driving stroke respectively, and means for moving said jacking means toward said driver in alternation with the movement of said loading member to bring the work within the path of said driver before it reaches the end of its pricking stroke, whereby the work is pricked for the reception of fastenings to be driven therein.

19. In a fastening inserting machine, fastening inserting mechanism comprising a driver movable alternately through pricking and driving strokes, work supporting mechanism comprising a heel plate through which said driver operates and a jack frame movable toward said heel plate to hold the work thereagainst, a loading member for supplying fastenings to said fastening inserting mechanism, means for moving said loading member between and into register with said heel plate and driver from a loading position, said means being constructed and arranged to return said loading member to its loading position following the driving stroke of said driver, and means for moving said work supporting mechanism toward said driver in advance of the pricking stroke of said driver into the portion of the path of said loading member which is vacated during its return movement into its loading position.

20. In a heel attaching machine, a work support comprising a heel plate having fastening receiving passages and a jack movable toward said heel plate to hold the work thereagainst, fastening inserting mechanism comprising a driver movable through the passages in said heel plate in successive strokes of the same length first to prick the work and then to drive fastenings therein, means for moving said work support toward said fastening inserting means during its pricking stroke through a distance equal to the desired depth of penetration of the inserting mechanism into the work, means for supplying fastenings comprising a fastening string feeding device and a loader slide, connections between said work supporting and feeding device for causing the latter to feed lengths of fastening strings corresponding to the movement of said support toward said driver, means for moving said loader slide into and out of register with said driver before and after, respectively, its driving stroke, said work support being movable into the portion of the path of said loader slide which is vacated when it is moved out of register with said driver.

21. In a fastening inserting machine, fastening inserting mechanism comprising a driver movable through successive pricking and driving strokes of the same length, jacking means for supporting the work with its surface through which fastenings are driven disposed at a predetermined position with respect to said driver at the end of its driving stroke, means for moving said jacking means toward said driver before the completion of its pricking stroke by an amount equal to the desired penetration of the fastenings into the work, a loading member movable from a loading position into register with said driver in advance of its driving stroke, and feeding means for advancing strings of fastening material into said loading member when it is in its loading position, said means being operated by the movement of said jacking means toward said driver to impart a feeding movement to the fastening material corresponding to the depth of the penetration of the driver into the work.

22. In a fastening inserting machine, fastening inserting mechanism comprising a driver movable alternately through pricking and driving strokes, work supporting mechanism comprising a jack frame movable toward and away from said driver, a loading member movable from a loading position into register with said driver in advance of its driving stroke, feeding means for advancing strings of fastening material into said loading member, and means driven by said jack frame for operating said feeding means during the movement of said jack frame toward said driver.

23. In a fastening inserting machine, fastening inserting mechanism comprising a driver movable alternately through pricking and driving strokes, work supporting mechanism comprising a jack frame movable toward and away from said driver, a loading member movable from a loading position into register with said driver in advance of its driving stroke, feeding means for advancing strings of fastening material into said loading member, and connections between said jack frame and feeding means constructed and arranged to impart a driving movement to said feeding means corresponding to the movement of said jack frame toward said driver.

24. In a fastening inserting machine, fastening inserting mechanism comprising a driver movable alternately through pricking and driving strokes, work supporting mechanism comprising a reciprocatory jack frame, a loading member movable from a loading position into register with said driver in advance of its driving stroke, feeding means for advancing strings of fastening material into said loading member, and means for operating said feeding means comprising a lever and a link connected to said jack frame and lever.

25. In a fastening inserting machine, fastening driving mechanism, means for supplying fastenings to said driving mechanism comprising a loading member having a plurality of fastening receiving passages arranged according to the fastening design of said driving mechanism, and a shear plate having a series of passages arranged to direct strings of fastening material into the passages of said loading member, said loading member being movable away from said shear plate to sever fastenings from the strings and to deliver them to said driving mechanism, said loading member also having cutting edges associated with its passages and arranged in a design different from that of the passages of said shear plate thereby to cause the severance of the fastenings at different times.

26. In a fastening inserting machine, fastening forming mechanism comprising a shear plate having a series of passages arranged to receive strings of fastening material, and a loading member having a series of passages arranged in the fastening design of the passages of said shear plate, means for feeding the strings of fastening material into said loading member, a shearing edge formed on said loading member for each of its passages, said shearing edges being disposed in irregular offset relation with respect to said passages whereby the severance of the fastenings occurs at different times.

27. In a fastening inserting machine, a shear plate having a series of passages arranged to receive strings of fastening material, and a loading member arranged to cooperate with said shear plate to sever fastenings, said loading member having a series of passages arranged in the fastening design of the passages in said shear plate, said loading member also having a series of counterbores of different sizes formed concentric with its passages in its side adjacent to said shear plate, whereby the cutting action of said loading member and shear plate on the fastening strings is staggered.

28. In a fastening inserting machine, fastening driving mechanism, a heel plate having passages arranged to receive fastenings in the desired fastening design, said mechanism comprising a driver for inserting the fastenings into a work piece held against said heel plate, means for supplying fastenings to said driving mechanism comprising a shear plate and a loading member, said shear plate and member each having passages arranged according to the design of the passages of said heel plate, said loading member being movable into register with said heel plate from a position of register with said shear plate, and means for advancing strings of fastening material through the passages of said shear plate and loading member when they are in register, said shear plate and loading member each having a set of shearing edges associated with its passages, one set of said shearing edges being disposed in irregular offset relation with respect to the other set thereby to cause the severance of the fastenings at different times.

29. In a fastening inserting machine, a shear plate having a series of passages arranged to receive strings of fastening material, and a loading member having a series of passages adapted to receive the strings of fastening material from said shear plate, said loading member having a series of cutting edges arranged to cooperate with said shear plate to sever fastenings from the strings, each of said cutting edges being offset from the associated passage in said loading member whereby the severed end of the fastening is upset to prevent its falling out of said loading member.

30. In a fastening inserting machine, fastening driving means, mechanism for supplying fastenings to said driving means, said mechanism comprising a shear plate through which strings of fastening material are fed and a loader slide arranged to receive the portions of the strings which project out of said shear plate, and means for operating said loader slide to sever fastenings from the strings and to deliver the fastenings to said driving means, said loader slide having formed therein a shoulder and a cutting edge for each string of fastening material, said shoulder and cutting edge being disposed in an offset relation thereby to cause the head of the fastening severed from the string to be upset and lodged against said shoulder whereby the fastening is prevented from falling from said loader slide.

31. In a heel attaching machine, fastening inserting mechanism comprising a driver head having drivers arranged in a certain fastening design, a fastening-string feeding device, a loading member arranged to carry fastenings from beneath said feeding device into register with said drivers, a transfer plate having one set of passages of the fastening design of said drivers arranged to receive and guide said drivers, said plate having another set of passages of the same fastening design for guiding the fastening-strings from said feeding device into said loading member, work supporting mechanism adapted to receive any one of a set of heel plates having passages therein arranged in different fastening designs, and connections between said transfer plate and a selected heel plate operated upon the assembly of said transfer plate in the machine for preventing the assembly of a heel plate having a fastening design other than that of the drivers.

32. In a fastening inserting machine, fastening inserting mechanism arranged to receive any one of a set of drivers having different fastening designs, fastening supplying mechanism arranged to receive any one of a set of transfer plates of different fastening designs corresponding to the fastening designs of said drivers, a work support arranged to receive any one of a set of heel plates of different fastening designs corresponding to the fastening designs of the drivers, said heel plates having keyways located in different positions, indexing mechanism comprising a key member, and positioning means on each of said transfer plates arranged to cooperate with said indexing mechanism to aline said key member with the keyway of that heel plate which matches the selected transfer plate, whereby the assembly of a heel plate with a transfer plate of different fastening design is prevented.

33. In a fastening inserting machine, fastening inserting mechanism arranged to receive any one of a set of drivers having different fastening designs, fastening supplying mechanism arranged to receive any one of a set of transfer plates of different fastening designs corresponding to the fastening designs of said drivers, a work support arranged to receive any one of a set of heel plates of different fastening designs corresponding to the fastening designs of the drivers, and means for insuring the assembly of matching transfer plates and heel plates, said means comprising keyways located in different positions on said heel plates for the different fastening designs, indexing mechanism including a key member, and positioning means on each of said transfer plates arranged to cooperate with said indexing mechanism to position said key member for engagement only with the keyway of a matching heel plate.

34. In a heel attaching machine, a fastening inserting mechanism, fastening supplying mechanism constructed and arranged to form separate fastenings from strings of fastening material, said fastening supplying mechanism comprising a loading member movable from a loading position to deliver the separate fastenings to said fastening inserting mechanism, power operated means for driving said machine through one cycle of operation, an operator controlled starting member for actuating said power operated means, locking means for preventing the operation of said starting member, and connections between said locking means and loading member for releasing said locking means in response to movement of said loading member into its loading position.

35. In a heel attaching machine, fastening inserting mechanism, a loading member for supplying fastenings to said fastening inserting mechanism, a feeding device operable to feed lengths of fastening strings into said loading member, power operated means for driving said machine through one cycle of operation, a starting member for actuating said power operated means, normally inactive locking means for immobilizing said starting member, and means constructed and arranged to actuate said locking means upon the exhaustion of a fastening string, whereby said starting member is prevented by said locking means from being operated until the exhausted fastening string is replaced.

References Cited in the file of this patent

UNITED STATES PATENTS

| Number | Name | Date |
| --- | --- | --- |
| 413,973 | Small | Oct. 29, 1889 |
| 2,059,241 | Jorgensen | Nov. 3, 1936 |
| 2,085,755 | Jorgensen | July 6, 1937 |
| 2,541,132 | Thresh | Feb. 13, 1951 |